United States Patent [19]
Karras et al.

[11] Patent Number: 5,438,570
[45] Date of Patent: Aug. 1, 1995

[54] SERVICE OBSERVING EQUIPMENT FOR SIGNALLING SYSTEM SEVEN TELEPHONE NETWORK

[75] Inventors: Ernest Karras; Peter Chiodras; Michael Hatlak, all of Bensenville, Ill.

[73] Assignee: Tekno Industries, Inc., Bensenville, Ill.

[21] Appl. No.: 176,821

[22] Filed: Dec. 29, 1993

[51] Int. Cl.[6] ............................................... H04J 3/24
[52] U.S. Cl. ..................................... 370/94.2; 370/60; 370/94.1; 370/110.1; 379/133
[58] Field of Search ......................... 370/94.2, 94.1, 60, 370/60.1, 110.1; 379/133, 113

[56] References Cited

U.S. PATENT DOCUMENTS

| | | | |
|---|---|---|---|
| 3,917,915 | 11/1975 | Karras | 379/133 |
| 4,385,206 | 5/1983 | Bradshaw et al. | 370/110.1 |
| 4,897,835 | 1/1990 | Gaskill et al. | 370/94.1 |
| 5,150,357 | 9/1992 | Hopner et al. | 370/110.1 |
| 5,291,481 | 3/1994 | Doshi et al. | 370/60 |

*Primary Examiner*—Douglas W. Olms
*Assistant Examiner*—Shick Hom
*Attorney, Agent, or Firm*—Laff, Whitesel, Conte & Saret

[57] ABSTRACT

Service observing equipment monitors, detects and makes call records from digital and audio information on an individual call basis. The observation equipment can monitor both a Signalling System Seven (SS #7) and a CCITT #7 in which data packets are transmitted along the high speed data links separated from the telecommunication audio channels. The call record indicates how trouble free and efficiently (or how troubled and inefficiently) individual calls are processed by the telecommunication network. A plurality of separate memory locations are assigned on an individual call basis, for the duration of a given call, to store data received over any of many data links and communication channels relative to that given call. After the call has terminated, the accumulated data is analyzed to determine the call's final disposition. A call record is restored in memory for reports and/or transmitted to a printer or another processor. Then, the emptied memory locations are reassigned to accumulate data relative to new calls. In addition, the service observation equipment can trap annoyance calls and generate disposition reports on threshold levels of operation, provide live observing of calls in progress, generate real-time and/or long term peak and average link occupancy reports, and display a listing of time stamped messages for a specific call in order to provide for protocol analysis.

28 Claims, 10 Drawing Sheets

FORMAT FOR CALL RECORD DATA STORAGE

SERVICE OBSERVING EQUIPMENT FOR SIGNALLING SYSTEM SEVEN TELEPHONE NETWORK

This invention relates to telephone service observing equipment and more particularly to equipment for observing service on a Signalling System Seven Telephone Network (SS #7) while being compatible with service observation on prior telephone networks.

BACKGROUND

Service observing equipment provide means for monitoring a telephone network in order to determine the quality of service that is being given to the subscribers served by that network. The end product of the service observation equipment is a report (called a "call record") telling the management and maintenance personnel of such networks: how many calls went through which equipment, the length of time required to perform the various call functions, the number and type of call failures, the location of congestion, flagrant dispositions, missing messages, excessive durations, premature cut offs, peak and overall link loading and the like. From these reports, the telephone company may acquire many advantages ranging from reports on routine maintenance, instant maintenance, planning future expansion, justifying billings and rate hikes, selling additional services and the like.

For traditional telephone networks, the service observation equipment merely attached itself to a call path and kept track of everything pertinent to the control of the network functions occurring on that path. This was possible because voice and all control signals were carried by the same call path and generally within the same signal band width (called "In-Band Signaling").

The network control over the call path begins with a subscriber station going off hook, a return of dial tone, an appearance of dial signals, etc. If the call went outside the calling office, there continued to be local supervision so that the service observation equipment was kept fully informed about all that it needed to know in order to provide its report. Thus, the service observation equipment simply attached itself to and monitored a single path for the duration of a call, "listening" to and recording the events as they occurred (e.g., dial signals, connect, ring back tone, answer, and hang up, etc.). On trunks and other calls, there may have been added signals unique to such calls, but the observation functions were about the same—sit there and "listen" for control signals on the only path involved in and dedicated to the call being observed.

The service given to the subscriber and the observation of service on these traditional networks were more than adequate during the days when telephone switching equipment operated at relatively slow speeds, as compared to modern digital operations. For example, relay, step-by-step, or cross bar systems operated at the millisecond speeds of electromechanical equipment. Nothing useful would have been gained by setting up a plurality of paths for the same call. Therefore, the service observation equipment had only one path to observe per call.

Another consideration is the nature of the service being given to a telephone network subscriber. In the jargon of the trade, prior to approximately the mid-1960's, a telephone network gave only "plain old telephone services" ("POTS"). Beginning sometime around the mid-1960's, the electronic speeds of computers, electronic switching, and the like, opened the door to many new and highly sophisticated features and services. Network engineering began preparing for the death of "POTS" by designing new protocols for establishing calls, and for giving new and novel services via telephone networks, such as video telephones, direct "conversations" between personal computers, calling subscriber identification, interactive networks and the like.

This death of "POTS" and modernization of telephone service coincided with the explosion of computer capabilities where incredible amounts of data could be transmitted over a single channel in very small fractions of time. The result opened a new world where all of the control signals from most networks could be transmitted over a single link or group of links having relatively low cost and high speed data capabilities. A computer could keep track of everything that was going on in the entire network so that the establishment and supervision of calls no longer had to be segregated on an individual call basis.

There is no longer a need to set up the relatively expensive communication path for voice, video, computer, etc. communication only to release it because switching blockage, busy conditions or the like, are encountered along the way. Rather than tie up expensive equipment, the new approach is not to set up the communication path itself until it is certain that everything is available and ready to be switched. This certainty is achieved by various electronic equipment communicating with each other via high speed data links. Then, after everything is found to be ready, a totally separate, exclusive communication path is set up via more expensive communication grade equipment for the individual subscriber's use.

The above-described new approach to telephone switching is known in the U.S. as "Signalling System Seven" and as "CCS #7" in the rest of the world. The System is defined by a protocol or standards for uniquely U.S. problems. The protocol for CCS #7 in the rest of the world is defined by the CCITT, which is the international committee for setting communication standards. For the most part, the protocols for SS #7 is defined by Bellcore. Signaling System Seven and CCS #7 are almost identical, except for differences which are required by existing equipment, local rules and regulations, and the like. Therefore, with minor modifications, the same service observation equipment can be used for both systems.

In general, these two protocols provide for a limited number of high speed, synchronous data links extending between switching transfer points ("STPs") which enable switching points or end offices ("SPs") to communicate directly with each other, independently of the voice or other communication paths used by the subscriber. More particularly, the calling office assembles certain required control, monitoring, and supervision information into data packets, each of which is identified by its own address assigned on a per call basis. The data packet also contains identifications of calling and called subscribers, types of calls, equipment, and other pertinent information relating to the call identified by the packet address or "routing label." A description of a data packet and the manner in which it is transmitted over data links has sometimes been likened to a letter and its journey through the mail. The data packet itself is similar to an envelope which is identified by a sender's address and a recipient's address. The envelope may travel over any of many alternate paths guided by these addresses. In fact, one might predict that an average envelope traveling from, say, New York to Los Angeles will likely pass through Chicago. However, there is no way of ever knowing which path will be followed by any individual envelope.

Converting this analogy to the Signalling System Seven, the data packet corresponds to the envelope. The "point codes" (the points to which and from which the data packets flow) of the data packet correspond to the addresses on the envelope. The sender's or return address is called the "Origination Point Code" ("OPC"). The recipient's address is called the "Destination Point Code" ("DPC"). The various facilities that may handle the data packet while en-route are called "Signal Transfer Points" ("STPs") if at an intermediate location or "Switching Points" ("SPs") if at the end offices.

The facilities which carry the data packets are called "Links." A given "A-Link" carries data packets only to or from the owner (SP) of the A-link. STPs, and thus A-links connecting SPs to STPs, occur in redundant pairs. A pair of STPs are linked by "C-links", which can provide alternate routing between the pair if one of the pair should overflow, go out of service, or have to transfer its load. An "E-Link" may provide an alternative to the A-Links by connecting a particular SP to other STPs. An "F-Link" extends directly between end offices (SPs) to bypass the other links, if necessary.

When all information is assembled into the data packet, it is transmitted over a high speed data link to a distant STP, SP, or other appropriate office. The appropriate STP's or offices communicate with each other, agreeing between themselves on whatever is required in order to set up, supervise, monitor, and release the communication path.

To put these high speed operations of the STP's, data links and communication paths into perspective, a large metropolitan area, such as New York City, may require only a total of four STP's and eight high speed data links to establish, supervise, and monitor all calls extended over 65,000 trunks. In New York City, for example, the service observation equipment monitors in the order of 700,000 calls per day on up to 6500 simultaneous "CIC's" (circuit Identification Codes) of the 65,000 trunks in the area. While all 6500 CIC's could occur simultaneously, that is an extremely small probability. At least theoretically all 65,000 trunks could be "busy" simultaneously, but that would not affect the high speed data links, for they are used only while sending data packets for "set up". These statistics are even more startling when one realizes that the high speed data links are usually operated at only 10-15% of capacity (loading) for reliability and safety of communication. Indeed, they are engineered not to exceed 40% loading at maximum saturation.

One can imagine that if a pair of the four New York STP's should go into a failure condition, not only would one half of the city calls fail, but all other telephone equipment across the nation which is trying to communicate with the failed STP's would also fail. The tie up could extend to associated equipment on a worldwide basis. To put the difficulty of and need for service observation equipment into better perspective, when one pair of the high speed data links recently went out of operation due to a software glitch, there was a mass communication failure which paralyzed the entire New York City, much of the telephone equipment in the northeast United States, and some equipment in other parts of the world.

The problem of service observation is further complicated because the STP's use any available data link whenever it is necessary for equipment to communicate with other equipment. The pertinent call information is routed by the addresses in the data packets, and not by the link or path that delivers the data. Thus, all eight data links (in the above example) could be involved at one time or another during the course of setting up a single call.

Moreover, telephone equipment is almost never completely replaced. Somewhere, at least a bit of almost every kind of telephone equipment installed over the last half century or so is still operating. Therefore, in the midst of monitoring and observing all of this new high speed data for electronically controlled equipment, the calls often run into traditional offices giving POTS service without the observation equipment necessarily knowing in advance what kind of equipment will be the next to return a pertinent signal.

SUMMARY OF INVENTION

Accordingly, an object of the invention is to provide service observing equipment to monitor any of many locations in order to detect and record information on individual calls. Another object is to monitor a combination of SS #7 protocol and conventional tone supervision. In this connection, another object is to assemble and print out data which indicate how trouble free and efficiently (or how troubled and inefficiently) those individual calls were processed. Then, after the individual call data have been processed, an object is to collate all such data to provide overall statistics rating the operation of the entire network over a period of time. Yet another object is to record all DTMF (Dual Tone Multifrequency, also identified as "Touch Tone") digits dialed after the call is completed in order to analyze electronic mailbox operations, fraud, etc. Another object is to monitor all SS #7 messages and report the percent link loading on each link simultaneously.

In keeping with an aspect of the invention, these and other objects are accomplished by service observation equipment having access to all high speed data links, carrier channels, telephone lines and/or trunks and any other communication channels which have been selected by the telephone operating company for observation. The observation equipment has a plurality of memory locations each being capable of storing data relative to a given data packet. For the duration of a call, these locations are assigned individual addresses corresponding to the pertinent data packet address. As the data packets are transmitted along the high speed data links, the service observation equipment decodes those packets having an address of interest and stores them in the pertinent memory location having that address assigned to it. The progress tones over the assigned audio communication channel are monitored and corresponding data are also stored in the pertinent memory location.

After the receipt of the data packet indicating that a call has terminated, the data stored in the pertinent memory location for related data packets and progress tones are correlated and read out to make the appropriate service observation report ("call record") for that call and/or stored in secondary memory for further report processing. Then, the emptied memory location is reassigned to accumulate data relative to a new packet address.

BRIEF DESCRIPTION OF DRAWINGS

A preferred embodiment of the invention is shown in the attached drawings, in which.

BRIEF DESCRIPTION OF TELEPHONE SYSTEM

Figure 1:
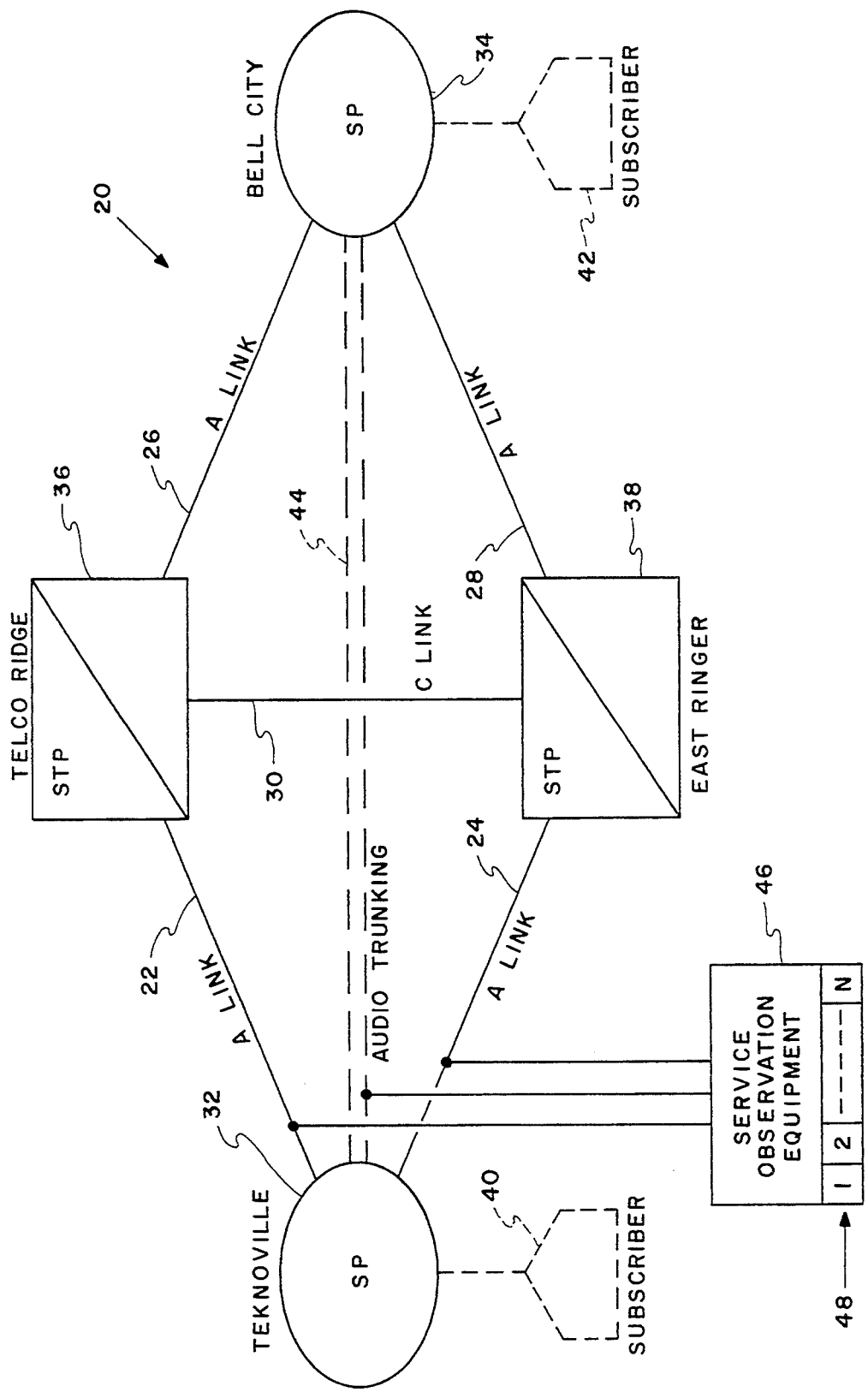
FIG. 1 is a simplified block diagram showing only the principles of a Signalling System Seven Telephone Trunking Network.

FIG. 1 shows a network 20 having four signalling links 22, 24, 26, 28 coupled in two mated pairs (i.e., 22/24 and 26/28). A C-Link 30 joins the mated pair. These five links are associated with two city telephone networks 32, 34 (here called "Teknoville" and "Bell City," for convenience of description, the notation "SP" meaning end office switching points.) These signaling offices extend between the two cities via two "STP's" (Signaling Transfer Points) 36, 38. Once the signalling links 32, 34 have conveyed enough information back and forth, a calling subscriber 40 is connected to a called subscriber 42 via an audio or communication trunk 44. For the duration of the call, telephone equipment in the two cities 32, 34 keep each other informed as to the status of the call by passing data packets back and forth over the signal links.

In all, the data packets may have over forty different kinds of Message Signal Units ("MSU") which may be exchanged over the signal links 22–30 during any given call. Fortunately, only a few of these messages are used with great regularity. The most interesting of these few signals are:

| DESIGNATOR | MESSAGES |
| --- | --- |
| IAM | Initial Address message |
| ACM | Address Complete message |
| ANM | Answer message |
| REL | Release message |
| RLC | Release Complete message |
| COT | Continuity message |
| RSC | Reset circuit. |

If the foregoing analogy comparing a data packet on a signal link to a letter in the mail is not pushed too far, these and other messages may be thought of as being similar to the messages which are contained in letters carried within the envelopes.

In operation, a conventional call begins in Teknoville 32 with a calling subscriber station 40 going off hook, receiving conventional local dial tone, and dialing the telephone number of a called subscriber 42 in distant Bell City 34. Responsive to the dialed telephone number, the local exchange equipment in Teknoville 32 formulates a data packet containing an initial address message ("IAM") including all information required to initiate a call, such as: calling number, called number, and any other pertinent information such as a collect call, a call back with time and charges, etc. Then, a "Routing Label" is added to the data packet, such as Point Codes identifying the office "Teknoville" 36 as the originating office and "Bell City" 34 as the destination office.

The local call originating equipment SP 32 in Teknoville sends the data packet over an available link, such as link 22. A "Switching Transfer Point" STP 36 at an intermediate city "Telco Ridge," forwards the data packet over link 26 to call destination equipment SP 34 in the called end office in Bell City. If for any reason, link 26 cannot be used at this time, the data packet is sent via C-Link 30 to STP 38 at yet another intermediate city, "East Ringer". The data packet is then sent via the mated A-link 28 to SP 34.

Regardless of the path followed, the local end office at Bell City 34 takes the appropriate action required by the message which it receives in the data packet.

In this set up situation, the Bell City equipment prepares a data packet with the originating data packet addresses. The information in this data packet is an Address Complete Message, ACM. The Bell City Point Code is now the Originating Point Code, (OPC) and the Teknoville Point Code is the Destination Point Code, (DPC) for this newly formulated data packet. The Initial Address Message from SP 32 nominates an audio trunk 44 which Teknoville tested and found idle and now the Bell City equipment confirms its availability. Thus, the Address Complete Message ACM identifies and confirms the nomination of audio trunk 44. Both cities 32, 34 cut through on that trunk 44.

Thereafter, the local equipment at the two cities 34, 32 generate ringing current and ring back tone respectively to alert the called and calling subscribers. The called subscriber answers and then an Answer Message ANM data packet on the links 28 and 24 is returned from Bell City 34 to Teknoville 32. Conversation may now occur on the audio trunk 44.

Upon termination of the call, a data packet containing a Release Message REL is sent between the cities to release all equipment and to disconnect the audio trunk 44.

If the called subscriber 42 is busy when the Initial Address Message IAM is received by the SP equipment in the called exchange (Bell City 34 in this example), the data packet returned from Bell City is a Release Message REL. The audio trunk 44 is not seized at Bell City. The calling exchange at Teknoville 32 returns locally generated busy tone to calling subscriber station 40. Since the call failed to go through for a legitimate reason, the service observation equipment does not record a service failure but does record the busy signal for marketing purposes. However, if the call fails for a reason other than a called station busy condition, a fault should be recorded.

The inventive service observation equipment 46 is electrically connected to the A-Links 22, 24 which terminate at the Teknoville switching point 32 since it is assumed that this is the observing station. Therefore, service observing equipment 46 "listens" to an endless stream of data packets traveling back and forth over the links 22, 24. Each data packet is decoded and stored in a depository memory location at 48 which is individually assigned to a given call on a basis of the addresses contained within a data packet. For example, in the above described call, all data packets having an address individually corresponding to the call being described might have been collated in depository "1" at 48. The data packets having an address individually corresponding to another call might have been collated in depository "2." In this manner, the service observation equipment 46 can track, analyze, and report on each call carried by links 22, 24 simultaneously.

The call report prepared by service observation equipment 46 includes any desired information relating to the calling and called numbers, call set up, call in progress, call termination, faults, causes of faults, billing, response time, and the like. Moreover, since the service observation equipment 46 is connected to both of the A-Links 22, 24, the particular path used for transmission of any given data packet is irrelevant. In a completely modern setting, those data packets may include supervisory or maintenance information supplied by switching point equipment in the end office or information on the high or low quality of the transmission over the audio trunk 44.

While the capacity of the service observation equipment 46 depends upon the amount of equipment that is provided, one embodiment could monitor up to ten thousand simultaneous calls, with a resolution of event occurring as fast as one-thousandth of a second.

Some calls may encounter older equipment. For example, older switching equipment may use in-band signaling, MF dialing, or even dial pulses transmitted from a rotary dial telephone. Incomplete calls provide an example of trouble resulting from incompatible signalling between the older and newer equipment. The equipment which interfaces with this older equipment attends to converting its signals into the format which is being monitored. However, the computers in the observing equipment must still interpret what it "hears" in respect of the equipment that is signalling.

There are many different conditions which may result in call release, such as a busy line, blocking or all trunks busy which result in no billing. Blocking occurs when a connection takes a path which runs into an equipment busy condition when it would have gone through if another path had been followed. The subscriber hears the audible busy tone; however, the links carrying the data packets carry a normal release signal which does not either differentiate between release conditions or indicate the reason for release. A fault should be reported if the release occurred when the call ran into a busy intersection and the call is blocked. On the other hand, a normal busy is not a condition to be reported as a fault by the service observation equipment. Still other reasons for incomplete calls may be abandoned calls, fraudulent calls, and the like, some of which may be revealed by an appearance of ring back tone on the trunk, for example.

To provide for observation of service given by older equipment, the inventive equipment 46 may be connected to a trunk, to monitor tones which are returned over the trunk to the calling subscriber. When the equipment is connected to both the links and the trunk, equipment 46 compares the tones appearing on the audio trunk 44 with the signals appearing on the links to differentiate between various conditions which Signalling System Seven cannot detect.

ENLARGEMENT OF TELEPHONE SYSTEM

Figure 2:
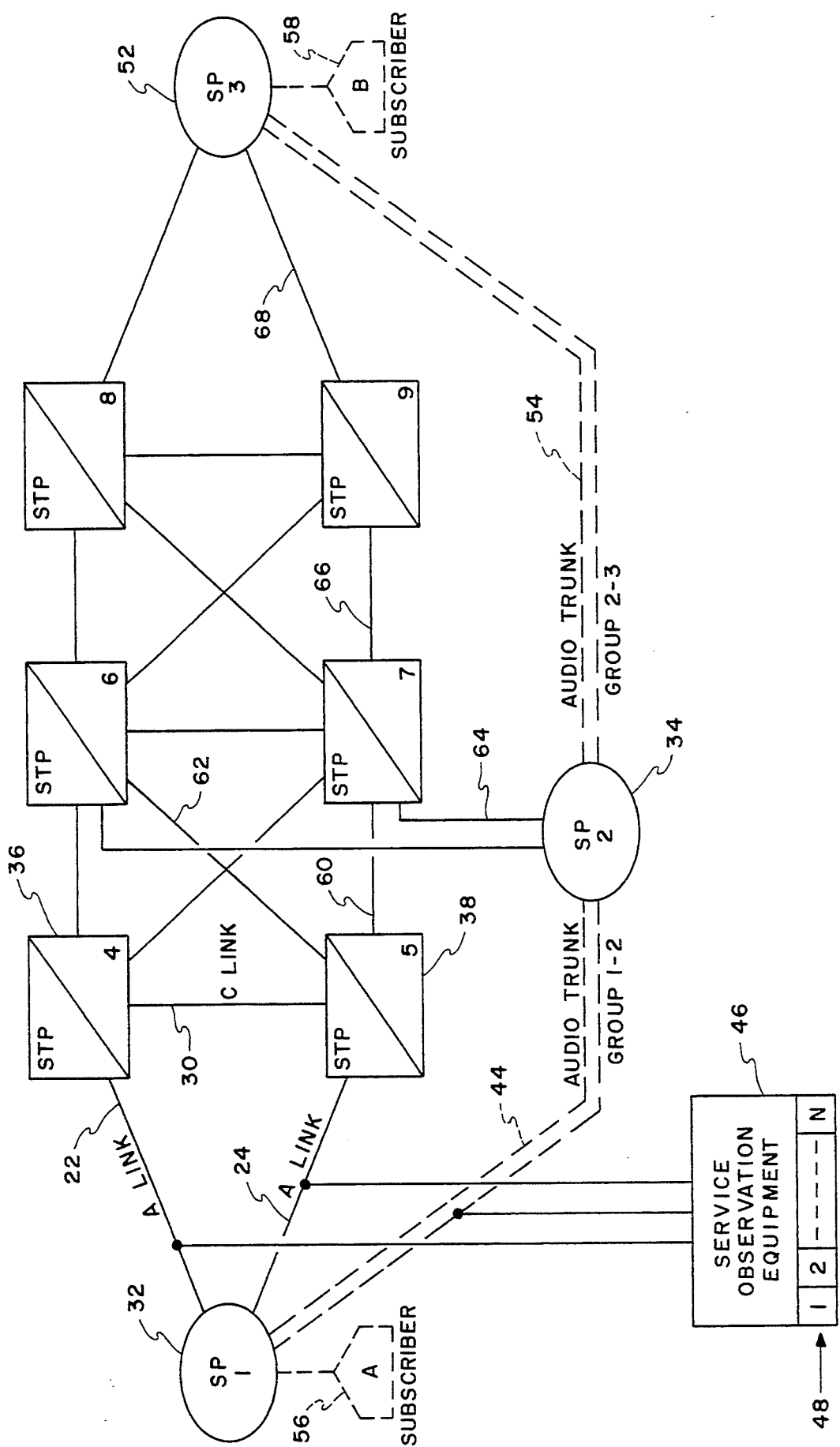
FIG. 2 is also a simplified block diagram showing how a system is expanded toward a more practical reality of a trunking network.

FIG. 2 illustrates how the Signalling System Seven expands to include both more end office switching points ("SPs") and more switching transfer points ("STPs"). The SPs are switching nodes 32, 34, 52, which are here identified by an individually associated number "1," "2," and "3." Although node 2 (SP 34) is an end office station, it serves as an intermediate tandem office transfer connection point. Audio trunks 44, 54 extend directly between end offices 32, 52, via the tandem office 34. Each of the switching transfer points ("STPs") is also a signalling node here identified by individually associated numbers "4," "5, " "6," . . . "9." The STPs are installed in mated pairs so that one link (24, for example) may take over the function of the other mated link (22 in this example) in case of a failure on link 22. Thus, for example, STP4/STP5; STP6/STP7; and STP8/STP9 are three mated pairs. The take over function may involve a C-Link 30 which extends between the mated pair.

To establish a call from calling subscriber 56 (FIG. 2) to called subscriber 58, the end office switching point "SP" 32 selects an audio trunk from a group of trunks 44 extending to switching point 34, and formulates an initial address message data packet IAM which may be sent over link 24 (for example) to STP5 at 38.

Under normal routing, STP5 forwards the initial address message data packet IAM over link 60 to STP7. However, if for any reason that connection cannot be completed via link 60, the data packet might be sent over link 62 to STP6. Assuming that STP7 is used, it responds to the destination point code and forwards the data packet over link 64 to the intermediate end office or switching point 34.

The end office or switching point 34 tests the selected audio trunk 44 for "glare," which means that it conducts a test for double seizure because trunk 44 could have been seized simultaneously by both of the offices 32 and 34. Once the possibility of glare has been eliminated, the intermediate switching point office 34 selects an audio trunk 54 in response to the called subscriber number which is in the data packet. Then, the switching point office 34 formulates a new data packet including information which it received from switching point 32 and adding information relative to the selected audio trunk 54. The SP2 sends the new data packet over link 64 to STP7. The data packet includes a field which indicates that a continuity test will be required to be sure that a connection between the audio trunks 44, 54 is completed.

Based upon the destination point code in the new data packet, it is forwarded over link 66, STP9, link 68, and SP2 to the switching point SP3 in the end office 52 serving the called subscriber 58. The switching point 52 tests the selected trunk 54 for glare and then responds to the field in the new data packet requesting a continuity test. Responsive thereto, the switching point office 52 closes a loop across trunks 54, 44. The office 32 detects the closed loop and on a sample basis applies continuity tone to the selected trunk 44. The switching point office 52 responds to the tone and returns a continuity signal from its end. When the originating office 32 receives the continuity signal sent from office 52, the successful establishment of a two way audio channel is confirmed with a COT message from Office 32 to Office 52.

Then office 52 processes the call on the basis of information which it has received in the data packets. Ring back tone is returned over trunk 54 and a ringing signal is sent to subscriber station 58. Office 52 formulates a data packet with an address complete message ACM which is returned to the originating switching office point 32.

When the originating office switching point 32 receives an address complete message ACM, it awaits answer supervision or termination of the call. When the called subscriber 58 responds to the ringing, the office 52 recognizes the off hook condition and formulates a data packet containing an answer message ANM, which is returned to Office 32 via the data links. When office 32 receives the answer message, it cuts through the voice trunk and starts billing for the call.

When the calling party hangs up at the subscriber station 56, the originating office or switching point 32 formulates a data packet containing a release message REL, which is sent over the data links to the terminating office switching point 52. Responsive thereto, office 52 releases the local connection to subscriber station 58 and formulates a data packet with a release complete message RLC that is returned over the data links to originating station 32.

The call is now completed.

It should be again noted that the digital control of the network is carried out via data links which are completely separate from the audio trunks. Also, a comparison of FIGS. 1 and 2 makes it apparent that an expansion of the network is merely a matter of adding switching points (SPs) and switching transfer points (STPs) with high speed data links extending between them.

The STPs have a graded accessibility so that the traffic through them is more or less evenly divided between them. Thus, the many transfers of data packets are carried out through any of the STPs which happens to be idle and available at the time. Also, it is quite possible that the high speed data links could assign themselves to extend from originating office switching point 32 all the way to the terminating office switching point 52 without any action on the part of the intermediate offices, (STP's). Therefore, the service observation equipment 46 must be connected to "all" of the various data links available to the switching point where the observation occurs to decode and correlate all information that appears on the data links.

TOPOGRAPHY OF TYPICAL NETWORK

Figure 3:
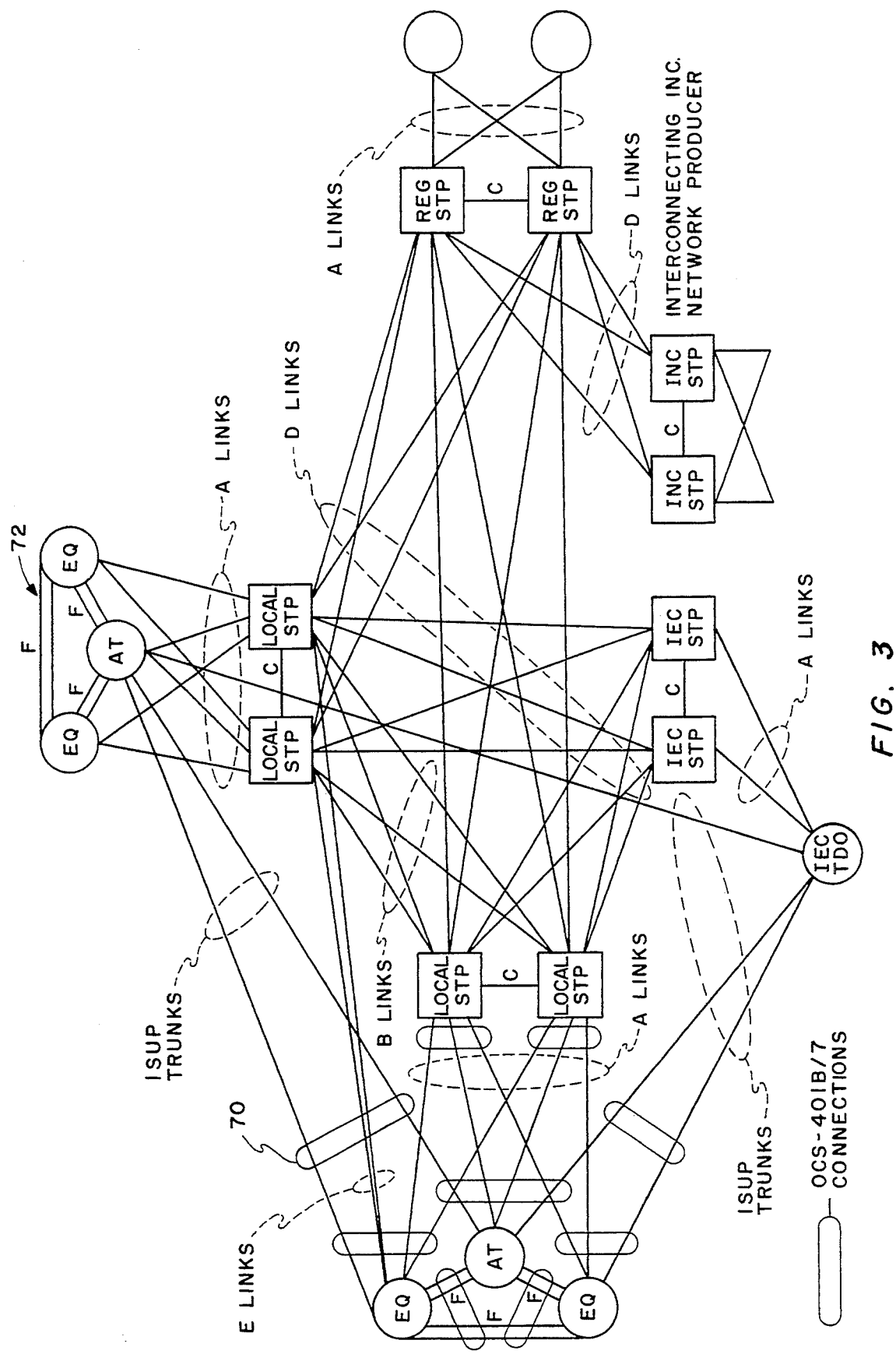
FIG. 3 is a block diagram showing of a possible and practical Signalling System Seven Trunking Network.

In the relatively simple showing of FIG. 2, the complexity does not come across as well as it should. A still simplified, but more realistic network topology of alternate linking is seen in FIG. 3. Although the topology of FIG. 3 has become more complex than that shown in FIG. 2, the principles are the same as those described above in connection with FIGS. 1 and 2.

The service observation equipment 46 is connected to any and all data links and associated audio trunks that may be selected for service observation by a telephone operating company. This selection is usually made on a basis of statistical studies, routine scheduling, complaints, or the like.

The E-Links (such as 70) provide connections to other mated pairs of STPs beyond the A-links. The F-Links (such as 72) are still more high speed data links which extend directly from one switching point (such as 32—FIG. 2) to another switching point (such as 52) without the intervention of any STP or other SPs.

BRIEF DESCRIPTION OF SERVICE OBSERVATION CONNECTIONS

Figure 4:
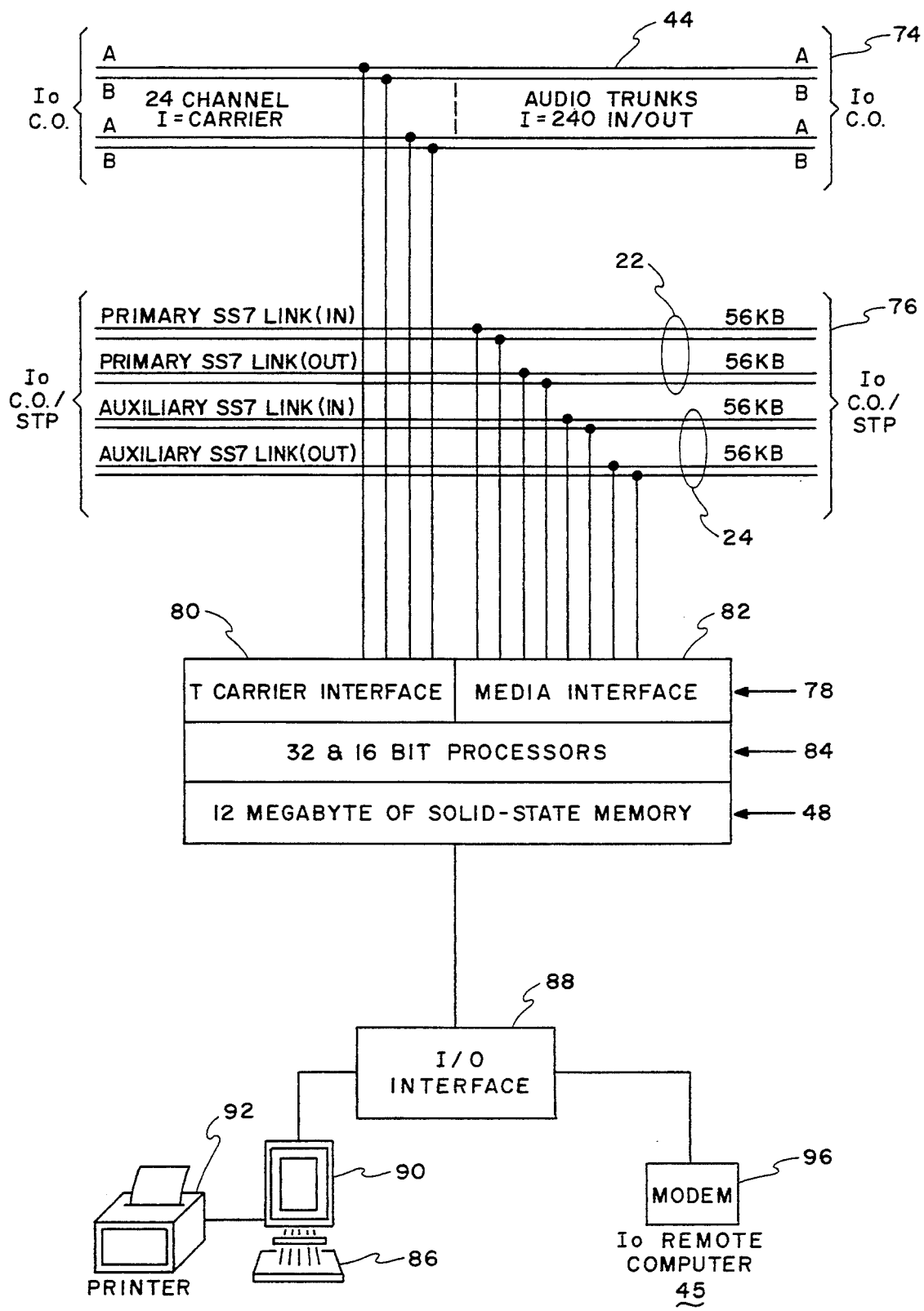
FIG. 4 is a block diagram showing of how the inventive service observation system is interconnected into a Signalling System Seven Network.

FIG. 4 is a block diagram of the inventive service observation equipment. The audio trunks (such as 44) are shown at 74. The high speed data links (such as 22 and 24) are shown at 76. The interface circuits 78 interconnect these trunks and links with the service observation equipment. A system that was built and tested could make simultaneous interconnections with up to ten span of 24 T-carrier channels (widely known and used in current telephony), or up to 240 audio trunks. The interface 78 is also connected to up to four primary high speed data links 22 and four alternative high speed data links 24. At the interface level, these two types of interconnection (data links and audio trunks) remain segregated as shown at 80, 82, so that there can not be any feedback between them. Of course, the capacity of the service observation equipment may be expanded over these numbers by providing more equipment.

The data taken in at interfaces 80 and 82 are processed by suitable microprocessors 84 and then stored in suitable memory depositories at 48, all data being segregated on a per call basis as identified by the pertinent data packet addresses or as identified by the pertinent audio carrier channel or trunk for the older equipment with in band signaling. For the newer equipment, the information carried by the data packets tells the microprocessor 84 which audio channel relates to the call being monitored. Among other things, the stored information which is processed at the microprocessor 84 may include the number and identity of circuits, whether any satellites are used, the continuity and quality of the audio circuit, including calling, called identifications and the disposition of the call.

In due course (usually programmed into the equipment, but also manually accessed at 86), the call record information stored in the data depositories is processed into any suitable reports and read out via interface 88, further analyzed by computer 90, and then printed out at 92.

In the alternative, the interface 88 may forward the call record information to a remote computer 45 via a modem 96.

Regardless of where or how the record is produced and processed, it is then used by the operating telephone company as it sees fit, ranging from marketing, to an installation of new equipment for providing a greater capacity, through maintenance, and to justification of billing and rate adjustments. Other uses include trapping annoyance calls, fraud and harassment detection, and service marketing, for example.

The information in the printed record is decoded from the information carried by the data packets and the audio trunks. The record segregates the information into twenty-one summary and fifty-nine detailed disposition categories. Among other things, the dispositions include: busy signals, call abandonments, no answers, circuit blockage, no answer messages, no ringing, message failures, no service available, general disposition reports of call failures of many types, are reported by day and time, destination and origin point codes, circuit identifications, trapping and tracing calls, and the like. Many of these dispositions would be missed on an interworking network without monitoring the voice signals in conjunction with the data packets.

Filters are provided in the service observation equipment for either diverting calls or otherwise providing special treatment for such things as trapping calls, for storing of selected streams of digits such as dialed numbers, flagrant dispositions, missing message, excessive duration or permanent calls, premature cutoff, etc. Provision also may be made for manually monitoring calls live and on a selected real-time basis.

Some of the summary reports may include general call record information about the network such as: periods of peak demand; call completion vs. call attempts; periods of busy vs. don't answer; rejections on specific lines; and violation of presently established thresholds and exceptions. Other of the summary reports are link loading information generated internally within the inventive system, such as: periods of peak demand; message counts; high, low and average link loading; percent occupancy; high, low and average message lengths; and violation of presently established thresholds and exceptions.

Still other types of service observations such as call trace, time stamp messages for selected calls, and the like, relate to such things as the network observation of established protocols for Signalling System Seven in order to find deviations therefrom.

The audio trunk observations include audio progress tones, such as: ringback, reorder, busy, various control tones used by voice carrier systems, special information tones (SITs) such as fax tone/detection, and the like.

BLOCK DIAGRAM OF SERVICE OBSERVATION EQUIPMENT

Figure 5:
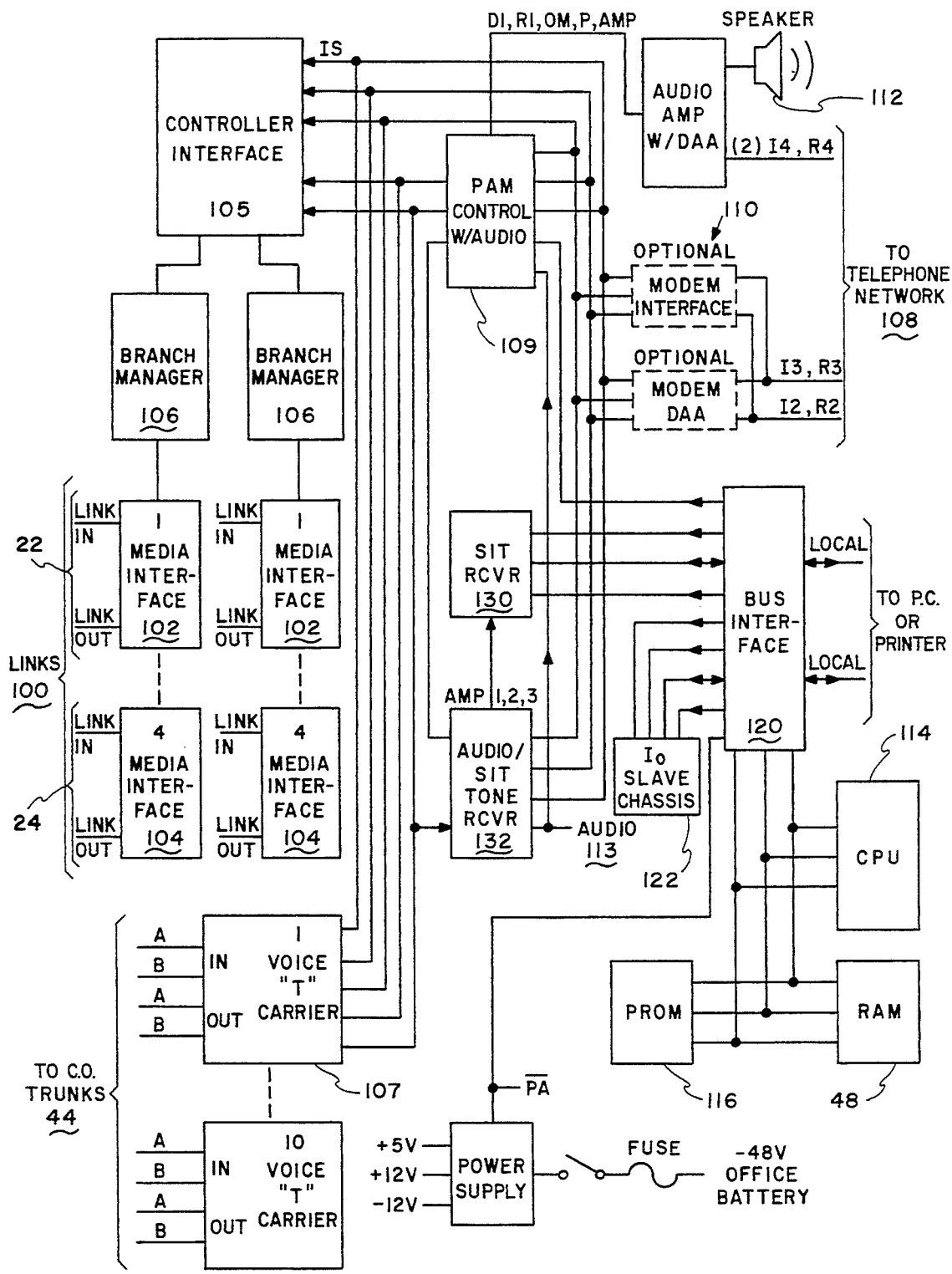
FIG. 5 is a block diagram showing the inventive service observation system.

FIG. 5 shows a block diagram of the service observation equipment. The high speed data links (such as 22, 24) are connected at 100 to the left of FIG. 5. Each link connection is made via a printed circuit board (e.g., data link 22 is made via 102). The same type of circuit boards may be provided for monitoring A-links, E-links, and F-links. These interface printed circuit boards are controlled via a controller interface 105 and two "branch managers" (same as controller) 106 which coordinate signals.

The branch manager 106 is identical to a controller 105, in design, with less memory. It fits between the media interface 102 and the controller 105 to increase the capability of processing messages from 2500 CIC's (Circuit Identification Codes) to 10,000 CIC's into call records.

The audio trunks (such as 44) are connected to the lower left hand corner of FIG. 5. As here shown, a pair of printed circuit boards 107 is specifically designed to work with a 24 channel T carrier or a 32 channel carrier. If some other carrier (such as an older N type of carrier) or if a simple audio trunk is connected at 44, a different printed circuit board interface is provided at 107 to match the termination needs of that carrier or trunk.

A "DTMF receiver" 130 and "audio/sit tone receiver" 132 monitor the wide band audio signals in order to detect dial tone re-order, busy ringback and touch-tone signals plus a SIT tone which generally precedes a recorded message, such as, "The number you called has been disconnected."

The tip (T) and ring (R) conductors of ordinary telephone lines 108 may also be connected to the service observation equipment at 108 in the upper right-hand corner of FIG. 5, and may terminate in suitable modem equipment to access the equipment from a remote location.

A loud speaker or other audio reproducer 112 is also provided for manually monitoring the existence and the quality of any of the voice channels. An audio input is provided at 113, the audio and inband tone signals being taken from the T carrier channels at any suitable location.

The operation of the system is carried out under the control of a central processing unit ("CPU") 114 which is controlled from an $E^2PROM$ memory circuit 116. Data which is obtained by the service observation is stored in a random access memory ("RAM") 48 under the control of the CPU 114.

A call appears on a monitored link and trunk. The CPU 114 assigns a receiver to serve the service observing needs and sends a time slot signal to the receiver. Thereafter, the CPU sends event signals every time that a monitored event occurs or there is a time out without the event occurring on an observed link or trunk. As specific events (message or tone) occur during the set up leading to a completion of a call, the various parts of the system may start timers. Most of these timing periods are built into the system.

The pulse amplitude ("PAM") control circuit 109 is described in U.S. Pat. No. 4,849,971. It receives input signals, assigns input circuits to receive the signals, and sends out digitally modulated signals which may be stored at a depository memory location 48 (FIG. 1), recorded on a paper tape, or magnetic tape, for example, to make a record of the events as they are being recorded. The PAM control circuit also feeds audio signals to an audio amplifier 110 and a loudspeaker 112 so that the quality of the sound may be monitored. The PAM control circuit also presents signals of all monitored events, such as an in band appearance of ring back tone, busy tone, call answered, touchtone, abandoned conditions, and the like, to a central processor unit or microprocessor. The PAM circuit 109 controls the assignment of receivers and mixes audio signals onto a PAM bus. For more information on the PAM circuit, please see U.S. Pat. No. 4,849,971.

DETAILED DESCRIPTION OF SERVICE OBSERVATION EQUIPMENT

Figure 6:
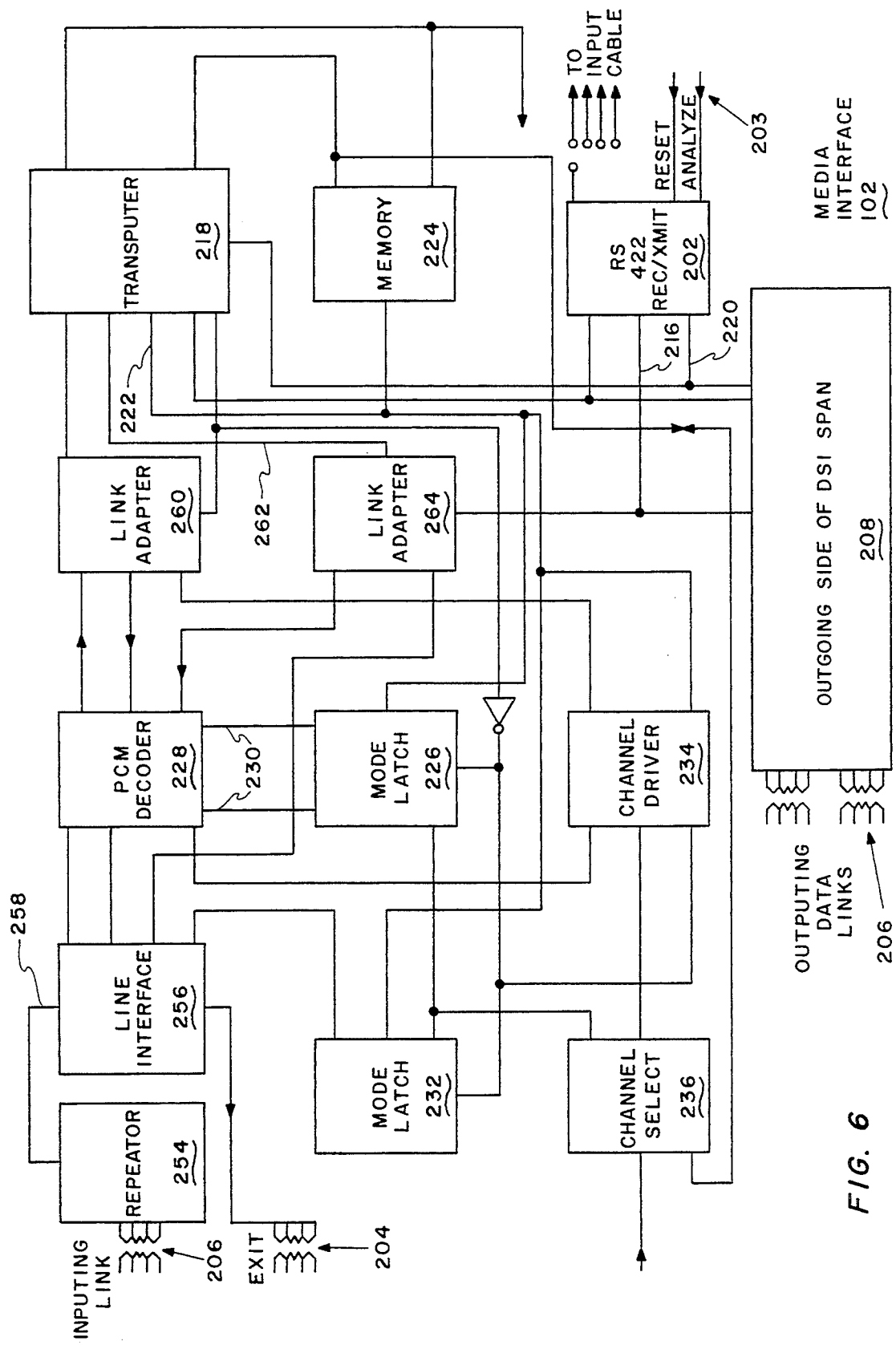
FIG. 6 is a block diagram of a media interface also shown in FIG. 5.
Figure 7:
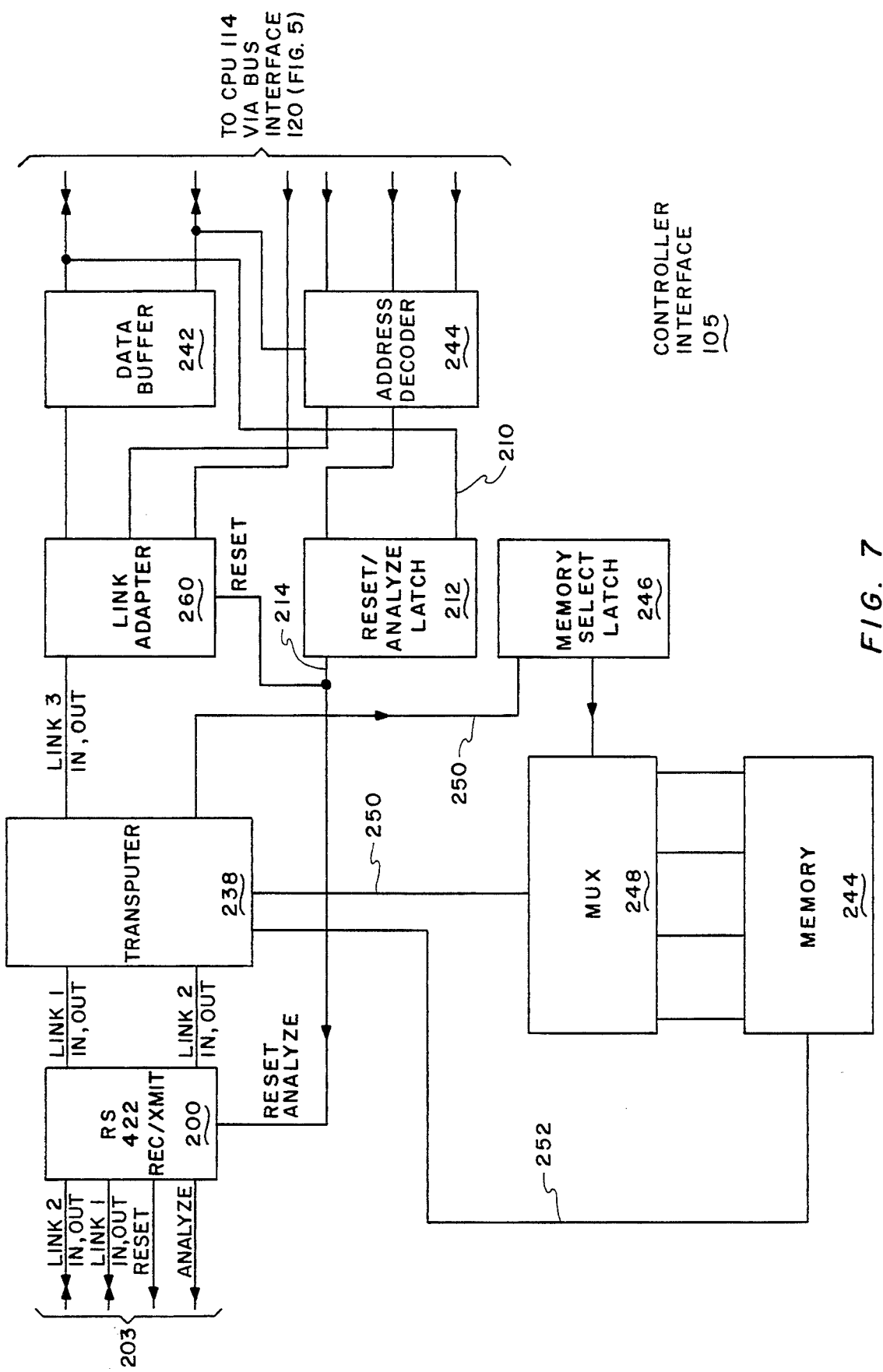
FIG. 7 is a block diagram of a controller interface also shown in FIG. 5.

FIGS. 6 and 7 show the circuits which interface between the monitored SS #7 channels and the CPU. FIG. 6 shows the media interface 102 and FIG. 7 shows the controller interface 105 or branch manager 106. The controller interface 105 (FIG. 7) communicates with the central processor unit ("CPU") 114 (FIG. 5) via bus interface 120. The upper left hand corner of FIG. 7 and lower right hand corner of FIG. 6 have a "RS422" Rec/xmit circuits 200, 202, respectively. These two "RS422" circuits are coupled together via a high speed serial data bus 203 so that the controller interface 105 and 106 (FIG. 7) and media interface 102, 104 (FIG. 6) may work as a unit.

The high speed data links 22, 24 (FIG. 5) are coupled to the media interface 102, 104 (FIG. 6) via transformers 204,206 (FIG. 6). The box 208 monitors the outgoing side of the SS #7 link or send leg that is identical to the incoming side or receiving leg, which is everything else that is shown in FIG. 6.

The manufacturer supplies the circuit of FIG. 6 on a printed circuit board which is dedicated to a particular system such as a (24 channel) T-carrier standard binary word data packet frame (193 bits in a frame beginning with a "flag"), a T-carrier extended data packet frame or a "CEPT" system (32 channel European standard). As a practical matter, about the only difference between these dedicated printed circuit boards is a capacitor and a crystal which makes a different frequency selection for each option. The telephone operating company knows the type of equipment which it wants to monitor and therefore selects the proper printed circuit board to connect to a trunk or data link.

This specification will now proceed with a description of the observation of service in a standard binary word data packet frame T-carrier, by way of example. For present purposes, all of the printed circuit boards for other systems operate the same way. Therefore, this description applies to all of the various systems.

If a call extended through the T-carrier encounters a different system (such as an older in-band signalling system with E and M wires for example), a digital switch in the telephone switching system makes its own conversion and then sends the appropriate signals to the service observing circuits of FIG. 6, 7.

When the service observing system is first powered up, the CPU 114 (FIG. 5) sends codes via bus interface 120 to reset/analyze latch circuit 212 which first resets and then sets the circuits in FIGS. 6 and 7 via wire 214 and the "RS422" circuits 200, 202. In the circuit of FIG. 6, the "RS422" circuit 202 sends a reset signal via wire 216 to circuits 232, 226, 264. The reset signal comes in to the transputer 218 via line 220. The preferred transputer is commercially available from INMOS, a member of the SGS-Thompson Micro-Electronic Group, at 1000 Aztec West, Almondsbury, Bristol, Avon BS12 4SQ, U.K. This transputer is particularly attractive because its high speed serial link intercommunications concept permits any number of multiprocessing configurations for greater processing flexibility and power in achieving somewhat the same objectives, a perfect example is insertion of a branch manager and/or increasing the number of media interfaces feeding a branch manager or controller, or branch managers feeding a controller etc.

The transputer 218 makes any necessary judgment decisions in preparation for a circuit operation and sets the various circuits in the media interface circuit via wire 222. For example, memory 224 is prepared to receive and store information that the transputer may send to it in response to high speed data packets. Mode latch 226 is set to notify a PCM decoder 228 via wires 230 about the nature of the signals which will be received (e.g. regular super frame or extended super frame, etc.). The operating telephone company knows the nature of the trunk connected to the service observing equipment and initially sets the circuits accordingly. When a T-carrier is used the options for PCM decoder 228 are a standard frame binary word, an extended frame binary word, and a CEPT (a European standard) binary word. Via wire 222, the transputer 218 sets mode latch 232 which can "loop" around to send a received signal into the outgoing or transmit side 204. The transputer 218 also sets a channel select circuit 236 which selects the channel which will be observed as a link among the twenty-four T-carrier channels.

Once the initial settings are made, the media interface circuit (FIG. 6) does flag detection and ships message signalling units (MSU's) to the controller interface 105 or 106 (FIG. 7) via the "RS422" circuits 202, 200.

The objective of this service observation is to decode the high speed data packets and to assemble the decoded information into a "call record", which is the history of a single telephone call. The call record is put together from the SS #7 protocol's packets of information, such as the IAM, ACM, COT, ANS, REL, etc. These packets or MSU's are detected over any or all the links being monitored.

The controller interface 105 (FIG. 7) operates under the direction and control of transputer 238 which, in turn, is under the control of CPU 114 (FIG. 5). The transputer communicates with the CPU via link adapter 260, data buffer 242, and bus interface 120, with addressing carried out by address decoder 244.

The call record is accumulated in memory 244 which is a large RAM or group of RAMS. Each call record has an individual memory area which is selected by the transputer 238 when it operates a memory latch 246. The memory latch 246 sets a path through the MUX circuit 248 which directs any signals appearing on wire 250 into the memory area at 244 selected by the transputer 238. Periodically, the transputer sends refresh signals over wire 252 to the memory 244.

In operation, a call occurs and SS #7 data packets appearing on a 56–64K high speed data link are received at a transformer 206 (upper left hand corner of FIG. 6). The repeater 254 includes a pair of amplifiers which compensate for low signal levels and provide impedance matching. The data packet clock pulses are extracted from the received signal in order to coordinate the timing on the data link with the timing of the local equipment in FIG. 6. The repeater 254 forwards the received data pulses through the line interface 256, the PCM decoder, and finally strobed into link adapter 260 and on to the transputer 218. The transputer 218 coordinates operations by detecting errors in the data packets received from the data links while holding various circuits during the interval while the information transfer is in progress. The errors detected by link transputer 218 are such things as a premature loss of signal, jitter, too many bits in a data packet, loss of synchronism and the like. In case an error is detected, transputer 218 may release the observation of the call in progress.

The information signal is then transferred through link adapter 264 from the media interface (FIG. 6) through the "RS422" circuit 202 in FIG. 6 and over the high speed serial link 203 to the "RS422" circuit 200 in the controller interface or branch manager of (FIG. 7) and on to transputer 238 which selects a call record storage area in memory 244 dedicated to the call for the duration thereof. Transputer 238 sets the address of such area in latch 246 for the duration of the information transfer for the current data packet. Responsive thereto, the MUX 248 sets a path to the selected memory area identified by latch 246.

The data packet information received from the high speed data link is stored at the call record at location memory 244. Then, the circuits of FIGS. 6, 7 go on to store other information received in other data packets and relating to other calls in other memory locations, returning to the described call and memory location each time that a new SS #7 data packet with the pertinent address is received from a high speed data link.

When the information in a data packet indicates that a call is complete, the transputer 238 ships the accumulated call record information from memory 244 over the bus interface 120 to CPU 114 in FIG. 5. The memory space in memory 244 that was dedicated to the call being described is erased and then that space in memory 244 is free to be assigned to accumulate a call record for the next call.

Figure 8:
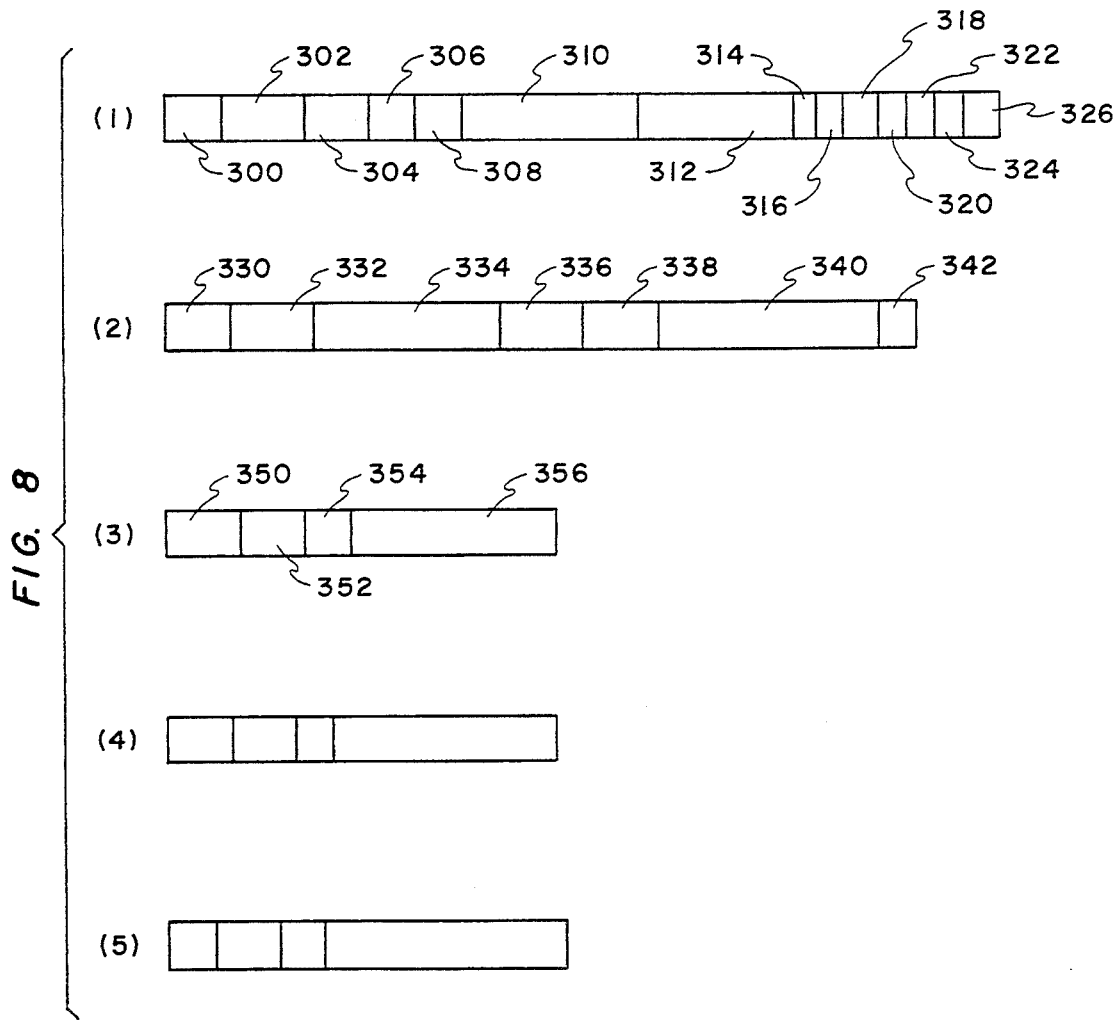
FIG. 8 is a six line format used for storing binary data in a system RAM.

FIG. 8 shows the five line format of binary words which is used to store information in RAM 48 (FIG. 5) of the inventive system after that information is either received over a data link or generated internally (such as the time of day). The binary signals may be either taken directly from or translation responsive to information signals in the data packets; or, they may be generated within the service observation equipment 46 (FIG. 1).

Line (1) of FIG. 8 is the data which is included in the message portion of the data packets. The first data block 300 or group of binary bits are numbers assigned by the user in order to identify pertinent equipment. For example, in FIG. 1, the identified equipment might be SP 32 or STP 36.

The second data block 302 or group of binary bits are a trunk code which identifies the audio trunk (such as 44) that is being used.

The third data block 304 or group of binary bits identify the trunk group being used; for example, the group might indicate a carrier, such as AT&T, Sprint, MCI, etc.

The fourth group 306 of bits gives an identification of the long distance carrier, such as AT&T, Sprint, MCI, etc.

The fifth group 308 of bits is an identification of an audio circuit assigned internally within the service observation equipment 46.

The bit 309 indicates whether the call is national or international.

The binary bits in group 310 are the originating point code, and in group 312 are the destination point code.

The binary bit code at 314 tells whether the call is incoming or outgoing.

The code at 316 indicates whether a call is or is not mandatory SS #7 signalling.

If part of the call path is served by E and M wire signalling (interworking), that information would appear at 317 and the call could not be completed because SS #7 is mandatory.

The data at 318 give the call transfer mode which tells whether it is a packet switched or a circuit switched call.

The data at 319 indicates the band width of the information transfer rate.

The data at 320 indicates symmetry, that is whether a bidirectional symmetrical (i.e. when bidirectional, data moves in both directions at the same rate and in the same data type). An asymmetrical data transfer is at different rates and in different data types. The term "symmetry" also includes other forms of signalling.

At 321, the bits indicate whether the call is paid, a charge card call, a reversed charge call, etc. For example, an "800" number would be indicated here.

At 322, the stored signal indicates whether a continuity check was required, i.e. whether the quality of the audio signal path was good, bad, or unknown.

At 324, there is a stored count indicating the number of ringing signals that were detected over audio trunks. This might be of value if there is, say, permanent ringing, a repeated dropping of a call after some specific ring, or a fraudulent use of the system as by using the number of rings in order to signal to the called party. This information may be used for detection of no ring, no answer failures, and ring no answer, for either marketing voice mail, or call forwarding, etc.

The binary bits stored at 326 indicate whether the calling or the called party hung up first.

Line (2) in the format of FIG. 8 is data which is derived by a data processor which uses its software in order to add information for interpreting the call.

Figure 9C:
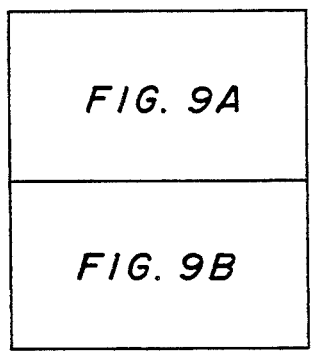
FIGS. 9A, 9B, when joined as showing in FIG. 9C, show a chart or tree of final dispositions of call data which is assembled into call records.
Figure 9A:
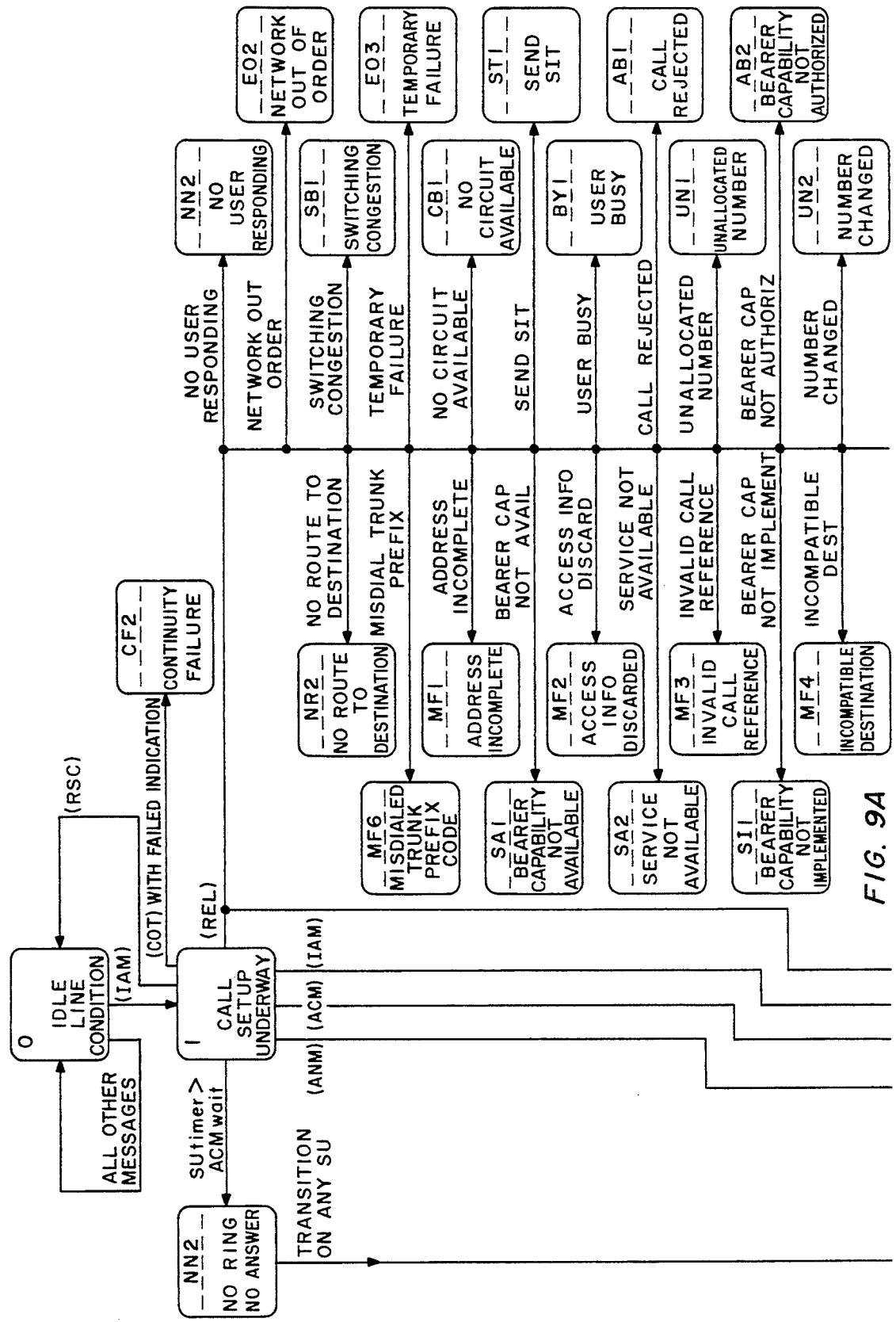

The data at 330 is a number which identifies a location on the call disposition tree of FIG. 9. For example, in FIG. 9A, "BY1" indicates that the user was busy when called. Thus, if this busy should occur a binary code meaning "BY1" would be stored in data block 330.

The data blocks 332, 334 are a date and time, respectively, which are signals generated internally within the service observation equipment to indicate when the call was initiated. The "time of call" is stored down to the millisecond level. The ending time of the call is stored at 336. At 338, the start up time stored at 334 is subtracted from the ending time stored at 336 to give the total duration of the call. The set up time stored at 339 is the interval between the <IAM> and the <ACM>. The data stored in the binary block 340 indicates the call release conditions, such as how much time was required to complete the release, and the like.

At 342, call billing information is stored, beginning with the time of the answer message and continuing to the end time.

Line (3) of FIG. 8 is information relating to the called or terminating number. The information stored at 350 identifies the status of the called party, such as an ordinary subscriber line, a pay station, or the like, for example. The information stored at 352 indicates the nature of the call, which may be any one of eleven different categories, such as: international call, domestic call, etc. At 354, a numbering plan is identified. At present there is only one numbering plan; however, in the future a plurality of suitable numbering plans may be provided. Thus, the data block provides room for future growth.

The called telephone number is stored at 356.

The data stored in line (4) is the same as the data stored in line (3), except that it is applicable to the calling or originating number. Among other things, the information taken from this line is used to provide calling subscriber identification.

Line (5) is for credit card, charged calls, and includes the usual digital information such as the credit card company, card number, expiration date, and the numbering plan. Line (6) is for the post answer message DTMF, dialed digits transmitted over the audio trunks, and indications of secondary dial-tone detected for voice mail troubleshooting, PBX hacking, and fraud detection.

Those skilled in the art will readily perceive many other data or information elements which may be extracted from the data packets and stored in the RAM. The inventive system is constructed to add such other data or information in the future.

CALL DISPOSITIONS

For this explanation, SS #7 signal units are depicted by using angle brackets and a three letter acronym format to help in an understanding and to delineate these items. When seen below, <IAM> represents the Initial Address Message, <ACM> is the Acknowledge Message, <REL> is the Release Message, <ANM> is the Answer Message, and <RCL> is the Release Complete Message. A "Cause Indicator" is contained within the <REL> message and is used in order to convey the reason for a cessation of a call setup dialogue. The "Cause Indicator" is a parameter of information derived from the SS #7 data packets.

The symbols in the left hand column are found in FIG. 9.

AB1—Access Barred—an <IAM> was received for a valid signal combination, an <ACM> may or may not have been received, no <ANM> was received, and a <REL> was received, with a non-normal CAUSE INDICATOR of "Call Rejected", or "Call blocked due to group restriction".

AB2—Access Barred—an <IAM> was received for a valid signal combination, an <ACM> may or may not have been received, no <ANM> was received, and a <REL> was received with a non-normal CAUSE INDICATOR of "Bearer Capability Not Authorized", or "Requested facility not subscribed".

BY1—Busy—an <IAM> was received for a valid signal combination, an <ACM> may or may not have been received, no <ANM> was received, and a <REL> was received with a non-normal CAUSE INDICATOR of "User Busy".

BY2—Busy—an <IAM> was received for a valid signal combination, an <ACM> may or may not have been received, no <ANM> was received, and a <REL> was received with a normal release CAUSE INDICATOR, but more than BSY Busy bursts appeared on the audio trunk. The number of BSY bursts are determined by the user and that number entered into software.

CA1—Call Abandon—an <IAM> was received for a valid signal combination, an <ACM> may or may not have been received, no <ANM> was received, and a <REL> was received with a normal release CAUSE INDICATOR. If the call occurred on a CUT THROUGH trunk, then at least one ring but less than a predetermined number of rings appeared. On a NON-CUT THROUGH trunk, a ring received timer had not expired at the cessation of the call. Or, an <IAM> was received for a valid signal combination, an <ACM> was not received, no <ANM> was received, and a <REL> was received with a normal CAUSE INDICATOR.

CB1—Circuit Blockage—an <IAM> was received for a valid signal combination, an <ACM> may or may not have been received, no <ANM> was received, and a <REL> was received with a non-normal CAUSE INDICATOR of "no circuit available", or "precedence call blocked".

CB2—Circuit Blockage—an <IAM> was received for a valid signal combination, an <ACM> may or may not have been received, no <ANM> was received, and a <REL> was received with a normal release CAUSE INDICATOR, but more than a certain number of reorder bursts appeared on the audio trunk.

CC1—Call Complete—an <IAM> was received for a valid signal combination, an <ACM> may or may not have been received, an <ANM> was received, a <REL> was received with a normal release CAUSE INDICATOR, and a <RLC> was received. This is the optimum completed call scenario.

CC2—Call Complete—an <IAM> was received for a valid signal combination, an <ACM> may or may not have been received, an <ANM> was received, a <REL> was received with a normal release CAUSE INDICATOR, but no <RLC> was received.

CC3—Call Complete—an <IAM> was received for a valid signal combination, an <ACM> may or may not have been received, an <ANM> was received, no <REL> was received, and no <RLC> was received.

CC4—Call Complete—not currently in use. (same as CC1, but <REL> had a non-normal CAUSE INDICATOR.)

CC5—Call Complete—an <IAM> was received for a valid signal combination, an <ACM> may or may not have been received, and <ANM> was received, but a timing problem existed with the reception of either the <REL> or the <RLC>. These messages may have preceded the <ANM>.

CF1—Continuity Failure—an <IAM> was received for a valid signal combination, an <ACM> may or may not have been received, a <COT> was received with a failed indication, but the system had a continuity tone on the line.

CF2—Continuity Failure—an <IAM> was received for a valid signal combination, an <ACM> may or may not have been received, a <COT> was received with a failed indication, and the system had no continuity tone on the line.

CN1—Call Complete MODEM—an <IAM> was received for a valid signal combination, an <ACM> may or may not have been received, an <ANM> was received, a <REL> was received with a normal release CAUSE INDICATOR, and a <RLC> was received. The system had at least CN milliseconds of Modem tone on the line. This is the optimum modem completed call.

CN2—Call Complete MODEM—AN <IAM> was received for a valid signal combination, an <ACM> may or may not have been received, an <ANM> was received, a <REL> was received with a normal release CAUSE INDICATOR, but no <RLC> was received. The system had at least CN milliseconds of Modem tone on the line.

CN3—Call Complete MODEM—an <IAM> was received for a valid signal combination, an <ACM> may or may not have been received, an <ANM> was received, no <REL> was received, and no <RLC> was received. The system had at least CN milliseconds of Modem tone on the line.

CN4—Call Complete MODEM—not currently in use, but intended for giving fax information.

DA1—Did Not Answer—an <IAM> was received for a valid signal combination, an <ACM> may or may not have been received, no <ANM> was received, and a <REL> was received with a normal release CAUSE INDICATOR. If the call occurred on a CUT THROUGH trunk then at least the predetermined number of rings or more appeared on the line. On a NON-CUT THROUGH trunk, the ring received timer had expired at the cessation of the call or <REL> had Cause Indicator with "No answer, user alerted" in Cause Indicator.

EO1—Equipment Out of Order—an <IAM> was received for a valid signal combination, an <ACM> may or may not have been received, no <ANM> was received, and a <REL> was received with a non-normal CAUSE INDICATOR of "Destination Out of Order".

EO2—Equipment Out of Order—an <IAM> was received for a valid signal combination, an <ACM> may or may not have been received, no <ANM> was received, and a <REL> was received with a non-normal CAUSE INDICATOR of "Network Out of Order".

EO3—Equipment Out of Order—an <IAM> was received for a valid signal combination, an <ACM> may or may not have been received, no <ANM> was received, and a <REL> was received with a non-normal CAUSE INDICATOR of "Temporary Failure".

IT1—Intercept—an <IAM> was received for a valid signal combination, an <ACM> may or may not have been received, no <ANM> was received, and a <REL> was received with a normal release CAUSE INDICATOR. The audio section detected a VACANT CODE SIT (special information tone) sequence.

IT2—Intercept—an <IAM> was received for a valid signal combination, an <ACM> may or may not have been received, no <ANM> was received, and a <REL> was received with a normal release CAUSE INDICATOR. The audio section detected a INTERCEPT SIT sequence.

IT3—Intercept—an <IAM> was received for a valid signal combination, an <ACM> may or may not have been received, no <ANM> was received, and a <REL> was received with a normal release CAUSE INDICATOR. The audio section detected a REORDER SIT sequence.

IT4—Intercept—an <IAM> was received for a valid signal combination, an <ACM> may or may not have been received, no <ANM> was received, and a <REL> was received with a normal release CAUSE INDICATOR. The audio section detected a NO CIRCUIT SIT sequence.

IT5—Intercept—an <IAM> was received for a valid signal combination, an <ACM> may or may not have been received, no <ANM> was received, and a <REL> was received with a normal release CAUSE INDICATOR. The audio section detected a SIT sequence.

MF1—Message Failure—an <IAM> was received for a valid signal combination, an <ACM> may or may not have been received, no <ANM> was received, and a <REL> was received with a non-normal CAUSE INDICATOR of "Address Incomplete".

MF2—Message Failure—an <IAM> was received for a valid signal combination, an <ACM> may or may not have been received, no <ANM> was received, and a <REL> was received with a non-normal CAUSE INDICATOR of "Access Info Discarded".

MF3—Message Failure—an <IAM> was received for a valid signal combination, an <ACM> may or may not have been received, no <ANM> was received, and a <REL> was received with a non-normal CAUSE INDICATOR of "Invalid Call Reference".

MF4—Message Failure—an <IAM> was received for a valid signal combination, an <ACM> may or may not have been received, no <ANM> was received, and a <REL> was received with a non-normal CAUSE INDICATOR of "Incompatible Destination".

MF5—Message Failure—an <IAM> was received for a valid signal combination, an <ACM> may or may not have been received, no <ANM> was received, and a <REL> was received with a non-normal CAUSE INDICATOR OF "Invalid Message", or "Invalid transit Network".

MF6—Message Failure—an <IAM> was received for a valid signal combination, an <ACM> may or may not have been received, no <ANM> was received, and a <REL> was received with a non-normal CAUSE INDICATOR of "Misdialed Trunk Prefix".

NA1—No Answer—an <IAM> was received for a valid signal combination, an <ACM> was received, no <ANM> was received, ANM wait Time expired with no other activity for the call.

NN1—No Ring No Answer—an <IAM> was received for a valid signal combination, an <ACM> may or may not have been received, no <ANM> was received, and a <REL> was received with a normal release CAUSE INDICATOR. The call occurred on a CUT THROUGH trunk and no rings were received.

NN2—No Ring No Answer—an <IAM> was received for a valid signal combination, an <ACM> may or may not have been received, no <ANM> was received, and a <REL> was received with a non-normal CAUSE INDICATOR of "No User Responding". Or an <IAM> was received, the ACM wait Time had expired, and no other messages were received.

NR1—No Route—an <IAM> was received for a valid signal combination, an <ACM> may or may not have been received, no <ANM> was received, and a <REL> was received with a non-normal CAUSE INDICATOR of "No Route to Network".

NR2—No Route—an <IAM> was received for a valid signal combination, an <ACM> may or may not have been received, no <ANM> was received, and a <REL> was received with a non-normal CAUSE INDICATOR of "No Route to Destination".

PE1—Protocol Error—an <IAM> was received for a valid signal combination, an <ACM> may or may not have been received, no <ANM> was received, and a <REL> was received with a non-normal CAUSE INDICATOR of "Message Not Implemented".

PE2—Protocol Error—an <IAM> was received for a valid signal combination, an <ACM> may or may not have been received, no <ANM> was received, and a <REL> was received with a non-normal CAUSE INDICATOR of "Parameter Not Implemented".

PE3—Protocol Error—an <IAM> was received for a valid signal combination, an <ACM> may or may not have been received, no <ANM> was received, and a <REL> was received with a non-normal CAUSE INDICATOR of "Invalid Parameter".

PE4—Protocol Error—an <IAM> was received for a valid signal combination, an <ACM> may or may not have been received, no <ANM> was received, and a <REL> was received with a non-normal CAUSE INDICATOR of "Protocol Error".

SA1—Service Availability—an <IAM> was received for a valid signal combination, an <ACM> may or may not have been received, no <ANM> was received, and a <REL> was received with a non-normal CAUSE INDICATOR of "Bearer Capability Not Available".

SA2—Service Availability—an <IAM> was received for a valid signal combination, an <ACM> may or may not have been received, no <ANM> was received, and a <REL> was received with a non-normal CAUSE INDICATOR of "Service Not Available", or "Barred".

SB1—Switch Busy—an <IAM> was received for a valid signal combination, an <ACM> may or may not have been received, no <ANM> was received, and a <REL> was received with a non-normal CAUSE INDICATOR of "Switching Congestion".

SI1—Service Implementation—an <IAM> was received for a valid signal combination, an <ACM> may or may not have been received, no <ANM> was received, and a <REL> was received with a non-normal CAUSE INDICATOR of "Bearer Capability Not Implemented", or "Bearer capability not presently available".

SI2—Service Implementation—an <IAM> was received for a valid signal combination, an <ACM> may or may not have been received, no <ANM> was received, and a <REL> was received with a non-normal CAUSE INDICATOR of "Channel Type Not Implemented".

SI3—Service Implementation—an <IAM> was received for a valid signal combination, an <ACM> may or may not have been received, no <ANM> was received, and a <REL> was received with a non-normal CAUSE INDICATOR of "Restricted Digital".

SI4—Service Implementation—an <IAM> was received for a valid signal combination, an <ACM> may or may not have been received, no <ANM> was received, and a <REL> was received with a non-normal CAUSE INDICATOR of "Service Not Implemented", or "Facility Not Implemented".

ST1—Special Tone—an <IAM> was received for a valid signal combination, an <ACM> may or may not have been received, no <ANM> was received, and a <REL> was received with a non-normal CAUSE INDICATOR of "Send SIT Sequence".

UF1—Unspecified Failure—an <IAM> was received for a valid signal combination, no other activity occurred for this call until a subsequent <IAM> was sent for the same circuit.

UF2—Unspecified Failure—an <IAM> was received for a valid signal combination, an <ACM> may or may not have been received, no <ANM> was received, and a <REL> was received with a non-normal CAUSE INDICATOR of "Unspecified".

UF3—Unspecified Failure—an <IAM> was received for a valid signal combination, an <ACM> may or may not have been received, no <ANM> was received, and a <REL> was received with a non-normal CAUSE INDICATOR of "Preemption".

UF4—Unspecified Failure—an <IAM> was received for a valid signal combination, an <ACM> may or may not have been received, no <ANM> was received, and a <REL> was received with a non-normal CAUSE INDICATOR of "Resource unavailable", or "Not a member".

UF5—Unspecified Failure—an <IAM> was received for a valid signal combination, an <ACM> may or may not have been received, no <ANM> was received, and a <REL> was received with a non-normal CAUSE INDICATOR of "Interworking failure".

UF6—Unspecified Failure—an <IAM> was received for a valid signal combination, an <ACM> may or may not have been received, no <ANM> was received, but a timing problem exists with the reception of either the <REL> or the <RLC>. They may have preceded the <ACM>.

UF7—Unspecified Failure—an <IAM> was received for a valid signal combination, and it was rejected due to a Double Seizure condition.

UN1—Unallocated Number—an <IAM> was received for a valid signal combination, an <ACM> may or may not have been received, no <ANM> was received, and a <REL> was received with a non-normal CAUSE INDICATOR of "Unallocated Number", "unallocated destination number", or "Undefined business group".

UN2—Unallocated Number—an <IAM> was received for a valid signal combination, an <ACM> may or may not have been received, no <ANM> was received, and a <REL> was received with a non-normal CAUSE,INDICATOR of "Number Changed".

These disposition codes are those presently being used. Those skilled in the art will readily perceive how these dispositions may grow and expand in the future. Therefore, the service observation equipment is constructed to accommodate such growth and expansion.

Figure 9B:
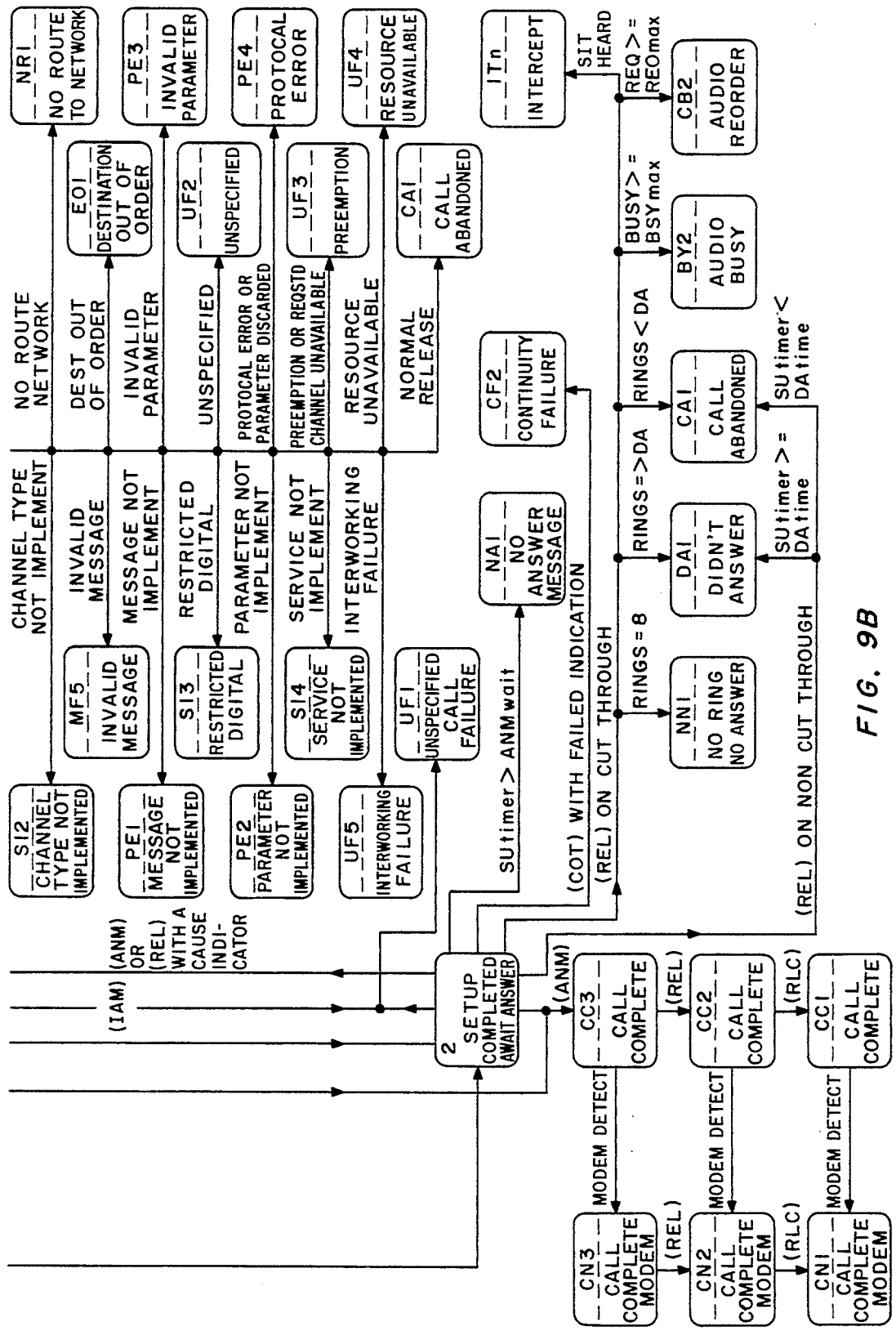

FIGS. 9A, 9B are to be joined as shown in FIG. 9C to form a chart or tree diagram showing the hypothetical data depository memory locations where information is accumulated for recording call disposition information. This FIG. 9A, 9B is a logical sequence of events which are useful for determining the dispositions, the logic of which was described above in the prior description. This disposition information is stored in a RAM memory location 330 (FIG. 8), when the disposition is determined.

In reality, the depository memory "locations" are dictated by the architecture of the random access memory ("RAM") and associated components that are used. Those skilled in the art know how to so store information in a RAM with or without physically assigning memory areas in a memory. Each disposition occurring during a call or an attempt to establish a call is stored in an appropriate one of these hypothetical locations.

The call record is a printout or other display of the number of events stored at each of these hypothetical data depository memory locations. Thus, for example, the number "10" is printed under a suitable heading if there are ten "no ring no answer" conditions stored at location NN2 (FIG. 9A) during a specific time period. Likewise, similar printouts are made for all of the other hypothetical data depository memory locations shown in FIGS. 9A, 9B. In addition, any other suitable information may be added responsive to a readout of stored information. In fact, the CPU may be programmed to record and print out almost anything which is within its capabilities and the SS #7 data packets.

The chart or tree begins at the top with an idle line condition. The signals which are received over the data links are identified by the designators which are set forth above in the left-hand column, and in FIGS. 9A, 9B. For example, the Initial Address Message (IAM) sent from box 0 (FIG. 9A) to box 1 starts the "Call Setup Underway" procedures. By following the various lines and observing their associated designators in FIGS. 9A, 9B, it is easy to tell where each of the signals identified by a designator leads in the chart or tree of call dispositions. For example, if the audio trunk does not switch through and provide a clear channel, the continuity message (COT) fails, which leads to a storage of information in the continuity failure box CF2.

The information indicated in FIGS. 9A, 9B is stored in RAM 48 (FIG. 5) responsive to the indicated designator signals taken from the data packets and added by the internal workings of the service observing equipment. When the call record is prepared, CPU 114 scans the locations of FIG. 9 in the RAM 48 and prints out or otherwise displays the information indicated by data stored in the hypothetical data depository memory locations.

A sufficient amount of memory storage space and unoccupied codes are provided to enable the service observation system to be expanded in order to work into the future. For example, the format data block 354 provides unused codes for storing any future numbering plans. For example, this data block can accommodate the differences between North American, European, and Asian numbering plans. Also, for example, by using the * and #keys, it is possible to count to a base of 12 and to provide many more numbers to accommodate the modems, fax machines, cellular phones and other equipment that is currently consuming telephone numbers.

Another example of presently unused capacity is the ability of the service observation equipment to record post answer dialed digits. The present trend is to provide a menu of numbers read out by a recorded voice which says things like "press 1 for the accounting department", "press 2 for the shipping department", etc. Also, there is voice mail where voice messages are recorded for the called party to hear at a future time. Unscrupulous people are now hiring hackers to break these and other codes and to listen to confidential messages recorded in voice mail.

Still another example of fraudulent telephone operation is the so-called "blue box" banditry where organized crime use techniques to prevent an identification of people who make free calls.

There are also a similar number of unused hypothetical data depository memory locations in the RAM 48 for future assignment. Thus, for example, when unscrupulous people learn how to manipulate their signals to defraud the public or telephone companies, an unused hypothetical location is assigned to store the occurrences of the signals transmitted to perpetrate the fraud.

The company owning the telephone network may assign new messages to the data packets in order to defeat the fraud. The microprocessor may be programmed to store a count in the assigned location in response to a combination of signals, data packets and any new messages as described above to provide other dispositions, which appear when the fraud occurs. For example, annoyance calls may be trapped, blue box banditry may be prevented, hackers may be identified, or the like. In addition, the information in line (4) of the format (FIG. 8) is used to identify the telephone number of the station from which the fraud occurs.

The user of the service observing equipment may designate the unused capacity in order to create a "Build Your Own Call Record or Display". Thus, if an unscrupulous person discovers a way to send a tone, dial a particular sequence of digits, or program a computer to simulate some kind of condition, the user of the inventive service observation equipment may assign the unused capacity to detect those frauds and to produce a call record of all pertinent data.

The invention enables the user to "build its own" call record format in order to customize the printout which it may select.

The one-on-one software combines the translation of the SS #7 data packets and the audio monitoring for specific trunks into a real-time display of the SS #7 messages as they are received and the "call record" information derived from them while simultaneously providing the real-time audio progress tones to perform live service observing locally or from remote via a dial-in port.

In addition, the call trace software function selects specific call records from memory and explodes their raw contents into a chronological listing of time stamped messages as they were received translated down to their most detailed parameter with humanly read labels for easy reading and performing protocol analysis or troubleshooting.

More particularly, the link loading functionality is not derived from the call record but more so from a separate counting in memory of the type of messages in each category or level of the SS #7 protocol such as ISUP, SSCP, etc. by each direction of a link. True the same messages may be used to derive the call records. These reports are provided as a real-time display, updated every second and longer-term daily reports by hour for the peak and average link loading levels.

Those who are skilled in the art will readily perceive how to modify the invention. Therefore, the appended claims are to be construed to cover all equivalent structures which fall within the true scope and spirit of the invention.

The claimed invention is:

1. A telephone service observation system for a telephone network controlled by digital data packets sent over high speed data links, said network comprising a plurality of switching points interconnected by said high speed data links, each of said data links carrying said data packets with information relating to individually associated calls which are identified in said packets by addresses assigned to said individually associated calls, said service observation system comprising:

means for giving said service observation system access to at least a selected one of said data links for monitoring said data packets as they are transmitted over said selected links;

memory means having a plurality of data depository memory locations for storing said monitored data packets appearing on said selected data links while said service observation system has access thereto;

means for assigning said packet addresses to identify corresponding individual ones of said data depository memory locations for the duration of an observed call identified by said packet address;

means responsive to said stored data packets for accumulating call record information derived from all of said data packets having the packet address corresponding to the address assigned to the depository memory location where the observed call record information accumulates for the duration of the call; and means responsive to a termination of an observed call represented by said packet address for reading out the call record information accumulated in said depository memory location identified by that packet address in order to indicate the quality of service given to the observed call.

2. The system of claim 1 and a plurality of communication paths which are independent of said data links, means responsive to said data packets for selecting a communication path for completion of said call, and means for coupling said service observation to a selected communication path for monitoring the transmission over said selected path, for determining the final disposition of a call, and for collecting post answer digits.

3. The system of claim 1 wherein said high speed data links provide a number of alternate paths for transmitting said data packets, and means in said service observing system for combining said data packets received over said alternate paths in order to monitor said data packets as a whole transaction regardless of the alternate path over which said data packets are transmitted.

4. The system of claim 1 wherein there are a plurality of communication paths and high speed data links, means for coupling said service observation system via separate interfaces to both said communication paths and said data links, data processing means common to said separate interfaces for collating and processing data received at said separate interfaces from said communication paths and from said data links, and means for storing collated data relative to a given call in said memory means at the depository memory location assigned to said given call.

5. The system of claim 1 and replaceable printed circuit boards having a circuit means thereon which are dedicated to a particular data packet framing structure whereby said service observation system may be adapted to monitor a selected type of framing structure by switching printed circuit boards.

6. The system of claim 5 and a central processing unit "CPU" for controlling said observation system, interface means controlled by said CPU and having transputer means thereon for taking in information from said data packets from a plurality of monitored locations, said memory means being responsive to said transputer means for accumulating said call record, and means controlled by said transputer and responsive to an end of a call for transferring an accumulated call record applicable to that call to said CPU.

7. A service observing system comprising means for processing data packets containing coded call information received from high speed data links associated with an asynchronous telecommunication network, each of said data packets containing address information relating that particular data packet to a given observed call while in progress within said network, means for assigning said service observing system to a selected location in said telecommunication network, means in said service observing system responsive to said high speed data appearing at said selected location and associated with said observed call for decoding said call and said address information contained within a data packet responsive to a receipt of that data packet at said selected location, memory means associated with said service observing system for accumulating decoded call information in a memory location assigned on a per observed call basis as identified by decoded address locations, means responsive to a termination of an observed call for reading out accumulated call information from said memory location identified by the address of the terminated observed call, and means for thereafter reassigning said memory location to accumulate information under an address assigned to a later observed call.

8. The observing system of claim 7 wherein said telecommunication network uses a signalling and control system known by the names of either a Signalling System Seven or a CCITT #7 Network.

9. The observing system of claim 8 wherein said call information includes at least an initial address message, an address complete message, an answer message, a release message, a release complete message, and a continuity message.

10. The observing system of claim 9 and PCM decoder means, mode latch means, central processing unit means for adapting said observing system to process and decode specific formats of said data packets by operating said mode latch means associated with said PCM decoder, and means for setting said PCM decoder means to read and decode specific format information.

11. The observing system of claim 10 and error detecting and holdings means for monitoring said data packets received by said service observing system for detecting errors in said observing system.

12. The observing system of claim 10 wherein said memory means comprises at least one random access memory, and means for setting a path to said memory location in said assigned memory means in response to address information in a data packet transmitted over said high speed data links associated with said telecommunication network.

13. The observing system of claim 7 and transputer means controlled by a central processor unit for receiving and analyzing data packets from said high speed data links and for accumulating the information contained therein.

14. A telephone service observation system comprising interface means coupled to individual data links and audio communication channels in a telecommunication network where said data links and audio communication channels are separate from and independent of each other; means associated with said interface means for connecting said service observation system to select and read data packets appearing on said data links; means responsive to reading data packets for decoding, storing, and accumulating call record information in said service observation system on a per observed call basis; call recording means; means responsive to a termination of an observed call for transferring accumulated call record information to said call recording means; microprocessor means for decoding packets and audio communications channel information into a final disposition category; and means associated with said microprocessor means for processing said call record information into reports relating to said observed call.

15. The system of claim 14 wherein said interface means comprises means for monitoring both said data link and said audio communication channels, and said call record includes means for monitoring the efficiency of said network in establishing and supervising said calls and the transmission over said communication channels.

16. The system of claim 14 wherein said telephone network is either a Signalling System Seven or a CCITT #7 Network.

17. The system of claim 14 wherein said data packets contain at least some coded information taken from a group consisting of: circuit identification codes, trunk group numbers, interchange carrier numbers, national or international codes, originating and destination point codes, SS #7 requests, interworking indicators, call transfer modes, information transfer rates, symmetries of the call, charge indicators, continuity check requests, terminator identification codes, cause indicators, link numbers plus called, calling and charge number's information, nature, plan and address, and from cause indicators.

18. The system of claim 14 wherein said call record includes at least some information taken from a group consisting of: time and date of decoded packets, setup times of packets, end times of release packets, hold time of circuits, release delay times, billing times of conversations, unit identifications, audio circuit numbers, direction of calls, ring detections, call dispositions, and time between packets.

19. The system of claim 14 and means for giving a separate report in response to at least some information taken from a group consisting of message counts; plus, peak, average, and total and duration of links' percent occupancy and loss of synchronizations, all as derived from said data packets.

20. The system of claim 14 and means associated with said interface means for monitoring said communications channels to detect at least some information derived from said monitoring and taken from tones in a group consisting of dial tone, ring back, call answer, call waiting, abandoned call, busy, don't answer, recorded message, special information, fax tones and DTMF signals.

21. The system of claim 14 and means associated with said microprocessor means for combining information from cause indicators of said data packets, certain timing and tones of audio communications channels into final dispositions taken from a group consisting of: access barred busies, call abandons, circuit blockages, call completions, continuity failures, modem answers, did not answers, equipments out of order, intercepts, message failures, no answers, no ring no answers, no routes, protocol errors, service unavailabilities, switch busies, service implementations, special tones, unspecified failures and unallocated numbers.

22. The system of claim 14 and means associated with said microprocessor means for processing said information from said call records taken from a group consisting of: call traps, call traces, violations of threshold and exceptions, general and flagrant dispositions of calls, failures, missing messages, excessive or permanent call durations, premature cutoffs, call completes vs. call attempts, periods of busies vs. don't answers, rejections, observations of directions, missing or out of order messages, times between messages; plus, disposition exceptions related to circuit identification codes, origination audio circuits, telephone numbers, destination or origination point codes.

23. A service observation system for monitoring a telephone network having separate audio and data links, said service observation system being separate from but connectible to said telephone network, said links carrying data packets containing different messages relating to an establishment of an observed call and events occurring in said telephone network pertaining to said observed call, said service observation system comprising a plurality of memory locations, each of said locations being individually associated with specific calls in order to store information about establishment of said observed call and specific events occurring in said telephone network, means responsive to said messages and a sequence of said messages in at least some of said data packets for storing call disposition information in an individual one of said locations identified by said messages and the sequence thereof relating to an observed call, and data processing means for producing a call record with a disposition category in response to said information stored in said locations relating to said observed call.

24. The system of claim 23 wherein said network has unused data packet capacity and said system has unused memory locations, and means for making future assignments of messages in said unused data packets and assignments of unused memory locations in said system in order to provide for future storage of information about presently unknown or unmonitored conditions in said telephone network.

25. The system of claim 24 wherein said presently unknown condition relates to fraudulent or attempted fraudulent use of the telephone network.

26. The system of claim 24 wherein said presently unknown condition relates to annoyance calls and said previously unused and assigned memory location provides a trap for said annoyance call.

27. The system of claim 23 and means in said service observation system for adding condition information to messages derived from said data packets for distinguishing between specific ones of said location which related to the same general condition.

28. A service observation equipment for attachment to a signal system seven telephone network wherein audio and data links are separate, said service observation system comprising means for monitoring data packets appearing on at least one of said data links selected for observation, means responsive to said monitoring means for storing information derived from said data packets and from internally within said service observing equipment, said information being stored in a six line format of binary signals, a first line of said format being individually related to a specific call, a second line of said format being generated within said service observation equipment for interpreting a call, a third line of said format being individually related to one of an originating and an intermediate or a terminating telephone system, a fourth line of said format being individually related to the other of said originating and said intermediate or said terminating telephone systems, a fifth line of said format being individually related to billing charges for a telephone call, and a sixth line registering post answer dual tone multi frequency, dial tone, FAX, call waiting tones, etc.

* * * * *

UNITED STATES PATENT AND TRADEMARK OFFICE
CERTIFICATE OF CORRECTION

PATENT NO. : 5,438,570
DATED : August 1, 1995
INVENTOR(S) : Ernest Karras; Peter Chiodras; Michael Hatlak It is certified that error appears in the above-indentified patent and that said Letters Patent is hereby corrected as shown below:

In the Drawings

In Fig. 5, Block 130, delete "SIT
RCVR
130"

and insert --DTMF
RCVR
130--

Signed and Sealed this

Ninth Day of March, 1999

Attest:

Q. TODD DICKINSON

*Attesting Officer*    *Acting Commissioner of Patents and Trademarks*